US012809907B2

(12) United States Patent
Venkataraman et al.

(10) Patent No.: US 12,809,907 B2
(45) Date of Patent: Nov. 24, 2026

(54) MACHINE LEARNING TECHNIQUES FOR GUIDELINE-BASED EXTRACTION OF RELEVANT INFORMATION FROM UNSTRUCTURED DATA

(71) Applicant: Optum, Inc., Minnetonka, MN (US)

(72) Inventors: Jagadish Venkataraman, Menlo Park, CA (US); Zahra Mahmoodzadeh Poornaki, Laguna Niguel, CA (US); Ardavan Saeedi, Jersey City, NJ (US); Fazlolah Mohaghegh, Frisco, TX (US); Kimmo M Karkkainen, Santa Monica, CA (US)

(73) Assignee: Optum, Inc., Minnetonka, MN (US)

( * ) Notice: Subject to any disclaimer, the term of this patent is extended or adjusted under 35 U.S.C. 154(b) by 141 days.

(21) Appl. No.: 18/663,807

(22) Filed: May 14, 2024

(65) Prior Publication Data

US 2025/0355923 A1 Nov. 20, 2025

(51) Int. Cl.
*G06F 16/30* (2019.01)
*G06F 16/334* (2025.01)
*G06F 16/383* (2019.01)

(52) U.S. Cl.
CPC ........ *G06F 16/383* (2019.01); *G06F 16/3347* (2019.01)

(58) Field of Classification Search
CPC ........................... G06F 16/383; G06F 16/3347
See application file for complete search history.

(56) References Cited

U.S. PATENT DOCUMENTS

| | | | |
|---|---|---|---|
| 8,103,524 | B1 | 1/2012 | Rogers et al. |
| 8,412,542 | B2 | 4/2013 | Mok et al. |
| 8,489,418 | B2 | 7/2013 | Gustafson et al. |

(Continued)

FOREIGN PATENT DOCUMENTS

| | | | |
|---|---|---|---|
| CA | 3181594 | A1 | 11/2021 |
| CN | 112463976 | A | 3/2021 |

(Continued)

OTHER PUBLICATIONS

Article entitled MedDM: LLM-Executable Clinical Guidance Tree for Clinical Decision-Making, by Li et al., dated Dec. 5, 2023 (Year: 2023).*

(Continued)

*Primary Examiner* — Mahesh H Dwivedi
(74) *Attorney, Agent, or Firm* — Alston & Bird LLP

(57) ABSTRACT

The present disclosure provide methods, apparatus, systems, computing devices, computing entities, and/or the like for processing a constrained query by (i) generating a cross-reference document data object by (a) extracting a plurality of questions from a guideline document, (b) assigning a rank to each of a plurality of passages from an unstructured data object for each of the plurality of questions, (c) generating a plurality of answers for the plurality of questions based on top ranking passages of the plurality of passages for each question to retrieval machine learning model, and (d) combining the plurality of answers, (ii) generating one or more cross-reference embeddings based on the cross-reference document data object, and (iii) training a predictive machine learning model based on the one or more cross-reference embeddings.

20 Claims, 7 Drawing Sheets

(56) References Cited

U.S. PATENT DOCUMENTS

| | | | | |
|---|---|---|---|---|
| 9,292,494 | B2 | 3/2016 | Ceusters et al. | |
| 9,424,299 | B2 | 8/2016 | Bufe et al. | |
| 10,318,534 | B2 | 6/2019 | Pinckney et al. | |
| 10,380,259 | B2 | 8/2019 | Lee et al. | |
| 10,699,215 | B2 | 6/2020 | Devarakonda et al. | |
| 10,854,334 | B1 | 12/2020 | Mcnair et al. | |
| 10,861,597 | B2 | 12/2020 | Norris et al. | |
| 10,978,179 | B2 | 4/2021 | Beltre et al. | |
| 11,011,266 | B2 | 5/2021 | Burger et al. | |
| 11,449,556 | B2 | 9/2022 | Jawagal et al. | |
| 11,475,358 | B2 | 10/2022 | Edgar et al. | |
| 11,556,099 | B1 | 1/2023 | Faro | |
| 11,561,987 | B1 | 1/2023 | Sager et al. | |
| 11,646,014 | B1 | 5/2023 | Harsola et al. | |
| 11,687,796 | B2 | 6/2023 | Muschett et al. | |
| 11,704,899 | B2 | 7/2023 | Salkola | |
| 11,837,334 | B2 | 12/2023 | Ginsburg et al. | |
| 12,057,032 | B1 | 8/2024 | Khanwalkar et al. | |
| 12,061,970 | B1 | 8/2024 | Lo et al. | |
| 12,125,410 | B1 | 10/2024 | Everest | |
| 12,153,884 | B1 | 11/2024 | Kowall et al. | |
| 12,164,873 | B2 | 12/2024 | Japa et al. | |
| 12,204,524 | B1 | 1/2025 | Birru et al. | |
| 12,277,788 | B2 | 4/2025 | Dong et al. | |
| 12,293,272 | B1 | 5/2025 | Poulis et al. | |
| 11,694,774 | B9 | 6/2025 | Nasrallah et al. | |
| 12,363,397 | B1 | 7/2025 | Yanamandra et al. | |
| 12,488,187 | B2 | 12/2025 | Chung et al. | |
| 2005/0234306 | A1 | 10/2005 | Schulte et al. | |
| 2014/0337306 | A1 | 11/2014 | Gramatica | |
| 2016/0147953 | A1 | 5/2016 | Menon et al. | |
| 2017/0262604 | A1 | 9/2017 | Francois | |
| 2018/0121603 | A1 | 5/2018 | Devarakonda et al. | |
| 2018/0121988 | A1 | 5/2018 | Hiranandani et al. | |
| 2019/0043606 | A1 | 2/2019 | Roots et al. | |
| 2019/0057310 | A1 | 2/2019 | Olmstead et al. | |
| 2019/0155926 | A1 | 5/2019 | Scheideler et al. | |
| 2019/0278760 | A1 | 9/2019 | Smart | |
| 2019/0340172 | A1 | 11/2019 | Mcelvain et al. | |
| 2020/0005922 | A1 | 1/2020 | Alhimiri | |
| 2020/0097601 | A1 | 3/2020 | Han et al. | |
| 2020/0226164 | A1* | 7/2020 | Eifert | G06F 16/3334 |
| 2020/0311198 | A1 | 10/2020 | Poon et al. | |
| 2021/0043310 | A1 | 2/2021 | Valuck et al. | |
| 2021/0057098 | A1* | 2/2021 | Mulligan | G16H 40/63 |
| 2021/0082549 | A1 | 3/2021 | Hampden et al. | |
| 2021/0209119 | A1 | 7/2021 | Claussenelias et al. | |
| 2021/0248517 | A1 | 8/2021 | Soppin et al. | |
| 2021/0249139 | A1 | 8/2021 | Thakore et al. | |
| 2021/0287141 | A1 | 9/2021 | Molloy et al. | |
| 2021/0295822 | A1 | 9/2021 | Tomkins et al. | |
| 2021/0334462 | A1 | 10/2021 | Kukreja et al. | |
| 2021/0397418 | A1 | 12/2021 | Nikumb et al. | |
| 2022/0035832 | A1 | 2/2022 | Kannan et al. | |
| 2022/0075948 | A1 | 3/2022 | Yuan et al. | |
| 2022/0108188 | A1 | 4/2022 | Wu et al. | |
| 2022/0277858 | A1 | 9/2022 | Zhao et al. | |
| 2022/0292262 | A1 | 9/2022 | Japa et al. | |
| 2022/0374605 | A1 | 11/2022 | Sethi et al. | |
| 2023/0016157 | A1 | 1/2023 | Ferreira Moreno et al. | |
| 2023/0017211 | A1 | 1/2023 | Scripka et al. | |
| 2023/0029829 | A1* | 2/2023 | Mass | G06N 3/045 |
| 2023/0031412 | A1 | 2/2023 | Singhal et al. | |
| 2023/0034011 | A1 | 2/2023 | Sarkar et al. | |
| 2023/0092559 | A1 | 3/2023 | Tekin et al. | |
| 2023/0101817 | A1 | 3/2023 | Sinha et al. | |
| 2023/0139397 | A1 | 5/2023 | Zhong et al. | |
| 2023/0153647 | A1 | 5/2023 | Au et al. | |
| 2023/0154596 | A1* | 5/2023 | Moustafa | G16H 50/20 705/2 |
| 2023/0169271 | A1 | 6/2023 | Shailabh et al. | |
| 2023/0169527 | A1 | 6/2023 | Morningstar et al. | |
| 2023/0170065 | A1 | 6/2023 | De et al. | |
| 2023/0196018 | A1 | 6/2023 | Rozen et al. | |
| 2023/0206087 | A1 | 6/2023 | Singaraju et al. | |
| 2023/0206661 | A1 | 6/2023 | Choi et al. | |
| 2023/0237028 | A1 | 7/2023 | Sweeney et al. | |
| 2023/0252239 | A1 | 8/2023 | Venkateshwaran et al. | |
| 2023/0317261 | A1 | 10/2023 | Vanggaard et al. | |
| 2023/0394605 | A1 | 12/2023 | Man et al. | |
| 2023/0419050 | A1 | 12/2023 | Asai et al. | |
| 2024/0054909 | A1 | 2/2024 | Rushkin et al. | |
| 2024/0104309 | A1 | 3/2024 | Hsu et al. | |
| 2024/0119257 | A1 | 4/2024 | Guo et al. | |
| 2024/0153296 | A1 | 5/2024 | Dong et al. | |
| 2024/0161520 | A1 | 5/2024 | Li et al. | |
| 2024/0202454 | A1 | 6/2024 | Chung et al. | |
| 2024/0232539 | A1 | 7/2024 | Venkateshwaran et al. | |
| 2024/0242095 | A1 | 7/2024 | Bharadwaj et al. | |
| 2024/0248963 | A1 | 7/2024 | Parham et al. | |
| 2024/0289364 | A1 | 8/2024 | Lau et al. | |
| 2024/0289395 | A1 | 8/2024 | Zhou et al. | |
| 2024/0378247 | A1 | 11/2024 | Kelly et al. | |
| 2024/0386015 | A1 | 11/2024 | Crabtree et al. | |
| 2024/0394545 | A1 | 11/2024 | Eisenschlos et al. | |
| 2024/0403341 | A1* | 12/2024 | Berglund | G06F 16/3326 |
| 2024/0403560 | A1 | 12/2024 | Radu et al. | |
| 2024/0412128 | A1 | 12/2024 | Rando | |
| 2024/0419830 | A1 | 12/2024 | Park et al. | |
| 2024/0428009 | A1 | 12/2024 | Toleubay et al. | |
| 2025/0005050 | A1 | 1/2025 | Krishnan et al. | |
| 2025/0005051 | A1 | 1/2025 | Khosla et al. | |
| 2025/0005063 | A1 | 1/2025 | Kulshreshtha et al. | |
| 2025/0005293 | A1 | 1/2025 | Nguyen et al. | |
| 2025/0005298 | A1 | 1/2025 | Dingliwal et al. | |
| 2025/0005427 | A1 | 1/2025 | Venkateswaran et al. | |
| 2025/0045316 | A1 | 2/2025 | Lee et al. | |
| 2025/0094480 | A1 | 3/2025 | Shi et al. | |
| 2025/0095642 | A1* | 3/2025 | Ghose | G06N 7/01 |
| 2025/0103619 | A1 | 3/2025 | Polatkan et al. | |
| 2025/0110957 | A1 | 4/2025 | Baldua et al. | |
| 2025/0110973 | A1 | 4/2025 | Yan et al. | |
| 2025/0117412 | A1 | 4/2025 | Jalagam et al. | |
| 2025/0124001 | A1 | 4/2025 | Everest | |
| 2025/0124060 | A1 | 4/2025 | Hackman | |
| 2025/0131289 | A1 | 4/2025 | Larson et al. | |
| 2025/0139445 | A1 | 5/2025 | Gao et al. | |
| 2025/0156644 | A1 | 5/2025 | Neerukonda et al. | |
| 2025/0181623 | A1 | 6/2025 | Jain et al. | |
| 2025/0181844 | A1 | 6/2025 | Rosset et al. | |
| 2025/0190465 | A1 | 6/2025 | Mahmood et al. | |
| 2025/0217403 | A1* | 7/2025 | Saeedi | G06F 16/383 |
| 2025/0245226 | A1 | 7/2025 | Madhavan et al. | |
| 2025/0278572 | A1 | 9/2025 | Morato et al. | |
| 2025/0278575 | A1 | 9/2025 | Vasseur et al. | |
| 2025/0285729 | A1* | 9/2025 | Pan | G16B 40/20 |
| 2025/0328771 | A1 | 10/2025 | Yuan et al. | |
| 2025/0375711 | A1 | 12/2025 | Weiser et al. | |
| 2026/0023936 | A1 | 1/2026 | Frick et al. | |

FOREIGN PATENT DOCUMENTS

| | | | |
|---|---|---|---|
| CN | 115358439 | A | 11/2022 |
| CN | 116662342 | A | 8/2023 |
| CN | 116628172 | B | 9/2023 |
| EP | 3839818 | A2 | 6/2021 |
| KR | 10-1983383 | B1 | 5/2019 |
| KR | 10-2020-0061097 | A | 6/2020 |
| WO | 2015/023674 | A1 | 2/2015 |
| WO | 2019/194980 | A1 | 10/2019 |
| WO | 2023/098971 | A1 | 6/2023 |
| WO | 2024/015323 | A1 | 1/2024 |

OTHER PUBLICATIONS

"Precision Navigation," Navigation—Health[at]Scale Technologies, (5 pages), (article, online), [Retrieved from the Internet Feb. 23, 2022] <URL: https://healthatscale.com/navigation/>.

Adomavicius, Gediminas et al. "Towards the Next Generation of Recommender Systems: A Survey of the State-of-the-Art and Possible Extensions," IEEE Transactions on Knowledge and Data Engineering, vol. 17, No. 6, pp. 734-749, Available online: http://pages.stern.nyu.edu/~atuzhili/pdf/TKDE-Paper-as-Printed.pdf.

(56) References Cited

OTHER PUBLICATIONS

Agrawal, et al., "Building Knowledge Graphs from Unstructured Texts: Applications and Impact Analyses in Cybersecurity Education", Information, vol. 13, (22 pages), 2022, https://doi.org/10.3390/info13110526.
Bose, et al., "A Survey on Recent Named Entity Recognition and Relationship Extraction Techniques on Clinical Texts", Applied Sciences, vol. 11, Sep. 8, 2021, https://doi.org/10.3390/app11188319.
Cook, et al., "Features of Effective Medical Knowledge Resources to Support Point of Care Learning: A Focus Group Study", PLOS, (7 pages), Nov. 25, 2013, doi:10.1371/journal.pone.0080318.
European Search Report for European Application No. 21162002, dated Aug. 30, 2021, (3 pages).
Fang, Hui et al. "Probabilistic Models for Expert Finding," European Conference on Information Retrieval, Apr. 2, 2007, (12 pages), Springer, Berlin, Heidelberg.
Github, "Langchain", accessed online at https://github.com/langchainai/langchain on Sep. 24, 2024, (9 pages).
Haponik, Artur, "Multimodal Models: Integrating Text, Image, and Sound in AI", addepto, (19 pages), Jan. 3, 2024.
Huo, et al., "Retrieving Supporting Evidence for Generative Question Answering", (10 pages), Sep. 20, 2023, arXiv:2309.11392v1.
Jiang, Hongxun et al. "How to Find Your Appropriate Doctor: An Integrated Recommendation Framework in Big Data Context," 2014 IEEE Symposium on Computational Intelligence in Healthcare and e-health (CICARE), Orlando, FL, (Year: 2014), pp. 154-158, DOI: 10.1109/CICARE.2014.7007848.
Konstan, Joseph A. "Introduction to Recommender Systems: Algorithms and Evaluation," ACM Transactions On Information Systems, vol. 22, No. 1, Jan. 2004, pp. 1-4, DOI: 10.1145/963770.963771.
Lehman, et al., "Do We Still Need Clinical Language Models?", available at arXiv:2302.08091v1, (23 pages), Feb. 16, 2023.
Lewis, et al., "Pretrained Language Models for Biomedical and Clinical Tasks: Understanding and Extending the State-of-the-Art", Association for Computational Linguistics, pp. 146-157, Nov. 2020.
Liu, et al., "What Makes Good In-Context Examples for GPT-3?", available online at arXiv:2101.06804v1, (12 pages), Jan. 17, 2021.
Mastorakos, et al., "Probing Patient Messages Enhanced by Natural Language Processing: A Top-Down Message Corpus Analysis", Health Data Science, vol. 2021, (10 pages), https://doi.org/10.34133/2021/1504854.
McDonald, David W. et al. "Expertise Recommender: A Flexible Recommendation System and Architecture," Proceedings of the 2000 ACM Conference on Computer Supported Cooperative Work, Dec. 2000, pp. 231-240, DOI: 10.1145/358916.358994.
Moon, et al., "Extractive Clinical Question-Answering With Multianswer and Multifocus Questions: Data Set Development and Evaluation Study", JMIR Publications, vol. 2, (20 pages), Jun. 20, 2023, DOI: 10.2196/41818.
Mustaqeem, Anam et al. "A Modular Cluster Based Collaborative Recommender System for Cardiac Patients," Artificial Intelligence in Medicine, vol. 102:101761, Jan. 2020, (ePub: Nov. 16, 2019), DOI: 10.1016/j.artmed.2019.101761.
NCBI Bookshelf, "In Brief: What Are Clinical Practice Guidelines? ", InformedHealth.org, (3 pages), Sep. 8, 2016.
Nikolaev, et al., "Joint Word and Entity Embeddings for Entity Retrieval from a Knowledge Graph", ResearchGate, (16 pages), Apr. 2020, DOI: 10.1007/978-3-030-45439-5_10.
Non-Final Rejection Mailed on Feb. 15, 2024 for U.S. Appl. No. 17/528,041, 8 page(s).
Nori, et al., "Can Generalist Foundation Models Outcompete Special-Purpose Tuning? Case Study in Medicine", Microsoft, (21 pages), Nov. 28, 2023, arXiv:2311.16452v1.
Notice of Allowance and Fees Due (PTOL-85) Mailed on Aug. 20, 2024 for U.S. Appl. No. 17/528,041, 3 page(s).
Notice of Allowance and Fees Due (PTOL-85) Mailed on Jul. 1, 2024 for U.S. Appl. No. 17/528,041, 9 page(s).
Page, Leigh, "Docs Struggle to Keep up with the Flood of New Medical Knowledge. Here's Advice", Medscape, Mar. 2, 2023, Available online at https://www.medscape.com/viewarticle/989043?form=fpf#vp_3.
Pampari, et al., "emrQA: A Large Corpus for Question Answering on Electronic Medical Records", available at generarXiv:1809.00732v1, (12 pages), Sep. 3, 2018.
Reboussin, David M. et al. "Systematic Review for the 2017 ACC/AHA/AAPA/ABC/ACPM/AGS/APhA/ASH/ASPC/NMA/PCNA Guideline for the Prevention, Detection, Evaluation, and Management of High Blood Pressure in Adults: A Report of the American College of Cardiology/American Heart Association Task Force on Clinical Practice Guidelines," Hypertension, vol. 71, No. 6, Jun. 2018, pp. e116-e135, DOI: 10.1161/HYP.0000000000000067.
Resnick, Paul et al. "Recommender Systems—Introduction to the Special Section," Communications of the ACM, vol. 41, No. 3, Mar. 1997, pp. 56-58, DOI: 10.1145/245108.245121.
Romanov, et al., "Lessons from Natural Language Inference in the Clinical Domain", Retrieved at arXiv:1808.06752v2, (14 pages), Aug. 27, 2018.
Sanaeifar, Ali et al. "Sephyres 1: A Physician Recommender System Based on Semantic Pain Descriptors and Multifaceted Reasoning," International Journal of Collaborative Research on Internal Medicine & Public Health, vol. 10, No. 1, (Year: 2018), pp. 735-746.
Shah, et al., "Creation and Adoption of Large Language Models in Medicine", JAMA, pp. 866-869, Aug. 7, 2023, doi:10.1001/jama.2023.14217.
Shapiro, D.W. et al. "Containing Costs While Improving Quality of Care: The Role of Profiling and Practice Guidelines," Annual Review of Public Health, vol. 14, (Year: 1993), pp. 219-241, Available online: https://www.annualreviews.org/doi/pdf/10.1146/annurev.pu.14.050193.001251.
Villacorta, Reginald et al. "Determinants of Healthcare Provider Recommendations for Influenza Vaccinations," Preventive Medicine Reports, vol. 2, Apr. 28, 2015, pp. 355-370, DOI: 10.1016/j.pmedr.2015.04.017.
Volker Tresp; J. Marc Overhage; Markus Bundschus; Shahrooz Rabizadeh; Peter A, Fasching; Shipeng Yu, Going Digital: A Survey on Digitalization and Large-Scale Data Analytics in Healthcare (English), Proceedings of the IEEE (vol. 104, Issue: 11, pp. 2180-2206), Nov. 2, 2016 (Year: 2016).
Wang, Chen et al. "The Research of Doctors Recommendation Algorithm based on Clustering and Collaborative Filtering," In Proceedings of the 23rd International Conference on Industrial Engineering and Engineering Management 2016, Mar. 8, 2017, pp. 233-237, Atlantis Press, Paris, DOI: 10.2991/978-94-6239-255-7_42.
Woolf, Steven H. et al. "Potential Benefits, Limitations, and Harms of Clinical Guidelines," The BMJ, vol. 318, No. 7182, Feb. 20, 1999, pp. 527-530, DOI: 10.1136/bmj.318.7182.527.
Yang, Yan et al. "Doctor Recommendation Based on an Intuitionistic Normal Cloud Model Considering Patient Preferences," Cognitive Computation, vol. 12, Dec. 6, 2018, pp. 460-478, DOI: https://doi.org/10.1007/s12559-018-9616-3.
Yue, et al., "Annotated Question-Answer Pairs for Clinical Notes in the MIMIC-III Database", PhysioNet, (4 pages), Jan. 15, 2021, https://doi.org/10.13026/j0y6-bw05.
Zoran Milosevic, Enabling scalable AI for Digital Health: Interoperability, consent and ethics support(English), 2021 IEEE 25th International Enterprise Distributed Object Computing Workshop (EDOCW) (2021, pp. 18-27), Oct. 1, 2021 (Year: 2021).
Final Rejection Mailed on Feb. 2, 2026 for U.S. Appl. No. 18/613,923, 29 page(s).
Non-Final Rejection Mailed on Nov. 20, 2025 for U.S. Appl. No. 18/591,292, 19 page(s).
Wang, Chengyu, et al., "NERank+: a graph-based approach for entity ranking in document collections", Frontiers of Computer Science, May 11, 2018, pp. 504-517, vol. 12, No. 3, Springer-Verlag GmbH, Germany.
Advisory Action (PTOL-303) Mailed on Jul. 16, 2025 for U.S. Appl. No. 18/613,923, 2 page(s).
Non-Final Rejection Mailed on Jul. 25, 2025 for U.S. Appl. No. 18/613,923, 22 page(s).

(56) References Cited

OTHER PUBLICATIONS

Final Rejection Mailed on May 6, 2025 for U.S. Appl. No. 18/613,923, 22 page(s).
Non-Final Rejection Mailed on Nov. 7, 2024 for U.S. Appl. No. 18/613,923, 21 page(s).
Chalkidis, Ilias, et al., "An Exploration of Hierarchical Attention Transformers for Efficient Long Document Classification", submitted Oct. 11, 2022 to Cornell University Olin Online Library Archive, available on the Internet at https://arxiv.org/pdf/2210.05529, 16 pages.
Final Rejection Mailed on May 14, 2026 for U.S. Appl. No. 18/591,292, 25 page(s).
Non-Final Rejection Mailed on Apr. 8, 2026 for U.S. Appl. No. 18/733,197, 17 page(s).
Non-Final Rejection Mailed on May 18, 2026 for U.S. Appl. No. 18/613,923, 30 page(s).
Yang, Zichao, et al., "Hierarchical Attention Networks for Document Classification", Proceedings of the 2016 Conference of the North American Chapter of the Association for Computational Linguistics: Human Language Technologies, Jun. 12-17, 2016, 10 pages, San Diego, CA.
Gao, Tianyu, et al., "SimCSE: Simple contrastive learning of sentence embeddings", In Proceedings of the 2021 Conference on Empirical Methods in Natural Language Processing, Nov. 7-11, 2021, pp. 6894-6910, Punta Cana, Dominican Republic.
Lo, Pei-Chi, et al., "Contextual Path Retrieval: A Contextual Entity Relation Embedding-based Approach," ACM Transactions on Information Systems, Jan. 2023, 38 pages, vol. 41, No. 1, article 1, Association for Computing Machinery, US.
Nguyen, Tai, et al., "In-context Example Selection with Influences", submitted Jun. 5, 2023 to arXiv.org, available on the Internet at https://arxiv.org/pdf/2302.11042, 27 pages.
Non-Final Rejection Mailed on Aug. 10, 2026 for U.S. Appl. No. 18/736,786, 36 page(s).
Non-Final Rejection Mailed on Oct. 2, 2026 for U.S. Appl. No. 18/657,327, 26 page(s).
Notice of Allowance and Fees Due (PTOL-85) Mailed on Jul. 23, 2026 for U.S. Appl. No. 18/733,197, 11 page(s).
Notice of Allowance and Fees Due (PTOL-85) Mailed on Oct. 5, 2026 for U.S. Appl. No. 18/613,923, 8 page(s).
Yao, Bingsheng, et al., "More Samples or More Prompts? Exploring Effective Few-Shot In-Context Learning for LLMs with In-Context Sampling", submitted Apr. 2, 2024 to arXiv.org, available on the Internet at https://arxiv.org/pdf/2311.09782v2, 19 pages.
Zhang, Jing, et al., "Subgraph Retrieval Enhanced Model for Multi-hop Knowledge Base Question Answering", In Proceedings of the 60th Annual Meeting of the Association for Computational Linguistics, May 22-27, 2022, pp. 5773-5784, MIT Press, US.

* cited by examiner

MACHINE LEARNING TECHNIQUES FOR GUIDELINE-BASED EXTRACTION OF RELEVANT INFORMATION FROM UNSTRUCTURED DATA

BACKGROUND

Machine learning models developed for analyzing enterprise data should be capable of seamlessly integrating structured data and lengthy text while effectively handling intricacies associated with extensive and complex unstructured data and their alignment with guidelines or policies. A challenge in utilizing extensive unstructured data as information sources for machine learning models is ensuring that only pertinent data is incorporated into a machine learning model. Moreover, safeguarding a machine learning model's input from data bias, such as from protected health information (PHI) or personally identifiable information (PII), is crucial to mitigate potential prejudices in the machine learning model's decision-making process. Accordingly, traditional techniques do not effectively combine features extracted from both structured and unstructured data without meticulous design, experimentation and testing.

Various embodiments of the present disclosure address technical challenges related to extracting relevant information from unstructured data and make important contributions to traditional machine learning and natural language processing techniques by addressing these technical challenges, among others.

BRIEF SUMMARY

In general, various embodiments of the present disclosure provide methods, apparatus, systems, computing devices, computing entities, and/or the like for processing constrained queries.

Various embodiments of the present disclosure make important technical contributions to improving machine learning training and the resulting predictive accuracy of predictive machine learning models, such as supervised machine learning models, by leveraging interpretable guideline-specific cross-reference data objects in place of traditionally less interpretable unstructured data. As described herein, information that exists in enterprise systems may encompass unstructured data, such as textual content found within a medical record of a patient's medical history. A significant amount of computing resources may be spent analyzing the unstructured data to compare them to established guidelines (e.g., to ascertain medical necessity in some example embodiments). To reducing training time and computing resources, without negatively impacting the predictive performance of a machine learning model, some techniques of the present disclosure may generate covert traditionally inflexible unstructured data to feature dense guideline-specific cross-reference data objects. These guideline-specific cross-reference data objects may, in turn, be leveraged to train predictive machine learning models using less data, time, and processing resources. Accordingly, by training a predictive machine learning models to generate predictions for unstructured data objects based on guideline-specific cross-reference data objects, the techniques described herein improve accuracy of performing predictive operations on unstructured data.

In some embodiments, a computer-implemented method comprises receiving, by one or more processors, a constrained query that comprises (i) an input unstructured data object that is associated with an entity and (ii) a reference to a guideline data object; generating, by the one or more processors, one or more prediction outputs for the constrained query using a predictive machine learning model that comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages, (ii) generating one or more cross-reference embeddings based on the guideline-specific cross-reference data object, and (iii) training the one or more learned parameters using the one or more cross-reference embeddings; and initiating, by the one or more processors, the performance of one or more prediction-based actions based on the one or more prediction outputs.

In some embodiments, a computing system comprises memory and one or more processors communicatively coupled to the memory, the one or more processors configured to receive a constrained query that comprises (i) an input unstructured data object that is associated with an entity and (ii) a reference to a guideline data object; generate one or more prediction outputs for the constrained query using a predictive machine learning model that comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages, (ii) generating one or more cross-reference embeddings based on the guideline-specific cross-reference data object, one or more prediction outputs based on the guideline-based query, and (iii) training the one or more learned parameters using the one or more cross-reference embeddings; and initiate the performance of one or more prediction-based actions based on the one or more prediction outputs.

In some embodiments, one or more non-transitory computer-readable storage media includes instructions that, when executed by one or more processors, cause the one or more processors to receive a constrained query that comprises (i) an input unstructured data object that is associated with an entity and (ii) a reference to a guideline data object; generate one or more prediction outputs for the constrained query using a predictive machine learning model that comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages, (ii) generating one or more cross-reference embeddings based on the guideline-specific cross-reference data object, one or more prediction outputs based on the guideline-based query, and (iii) training the one or more learned parameters using the one or more cross-reference embeddings; and initiate the performance of one or more prediction-based actions based on the one or more prediction outputs.

DETAILED DESCRIPTION

Figure 1:
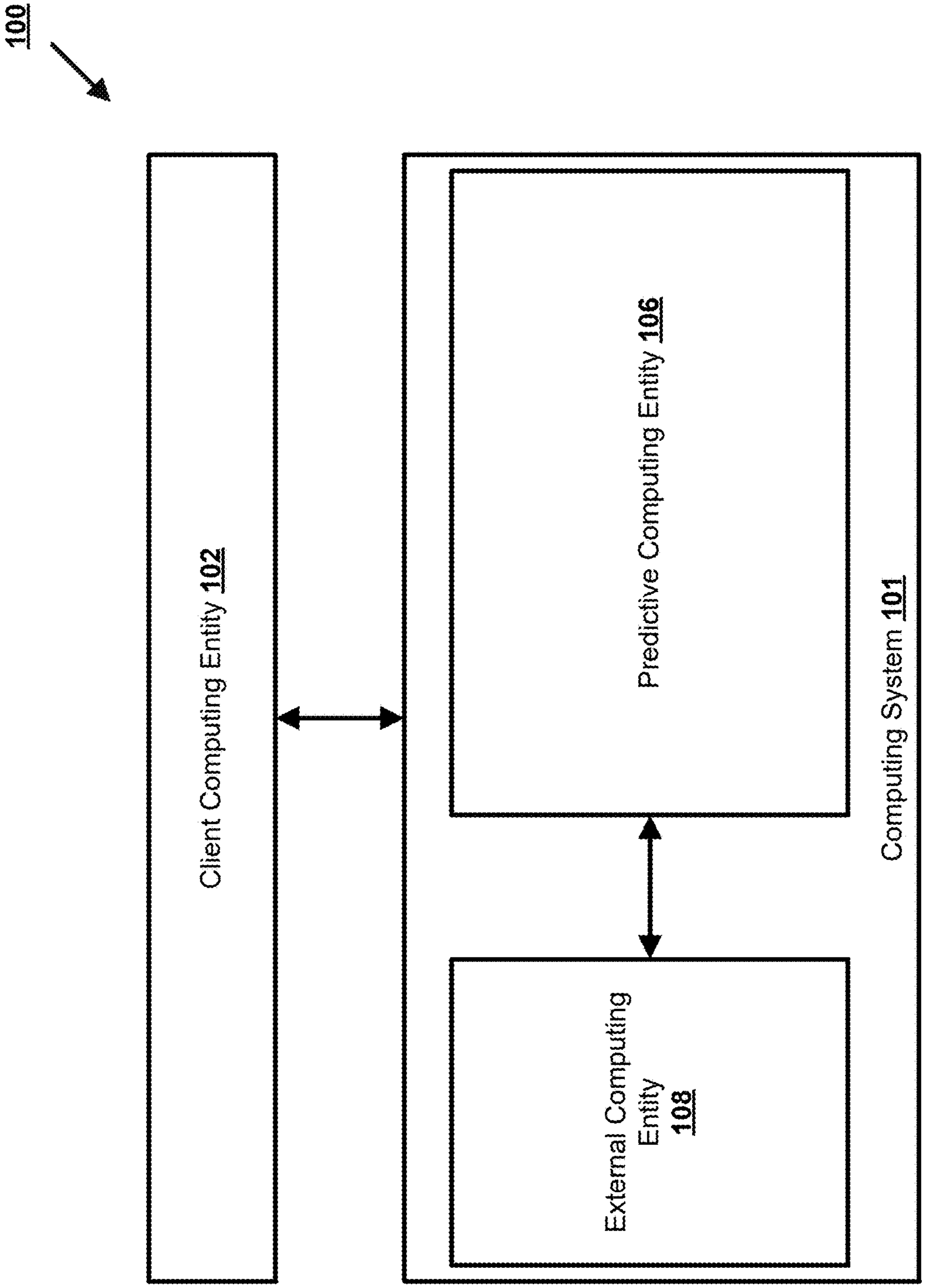
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 provides an example overview of an architecture 100 in accordance with some embodiments of the present disclosure. The architecture 100 includes a computing system 101 configured to receive predictive data analysis/query requests from one or more client computing entity 102, process the predictive data analysis/query requests to generate predictions, provide the generated predictions to the one or more client computing entity 102, and automatically initiate performance of prediction-based actions based on the generated predictions. The example architecture 100 may be used in a plurality of domains and not limited to any specific application as disclosed herewith. The plurality of domains may include banking, healthcare, industrial, manufacturing, education, retail, to name a few.

An example of a prediction-based action that may be performed using the computing system 101 comprises receiving a prediction request for an input unstructured data object based on a guideline data object, generating one or more prediction outputs based on the prediction request, and displaying the prediction request and the one or more prediction outputs on a user interface. Other examples of prediction-based actions comprise generating a diagnostic report, displaying/providing resources, generating, and/or executing action scripts, generating alerts or reminders, or generating one or more electronic communications based on the one or more prediction outputs.

In accordance with various embodiments of the present disclosure, one or more guideline-specific cross-reference data objects are generated for providing prediction outputs that are responsive to constrained queries that comprise (i) an input unstructured data object that is associated with an entity and (ii) a reference to a guideline data object. The one or more guideline-specific cross-reference data objects may be generated by extracting relevant passages from training unstructured data objects based on one or more guideline data objects. The one or more guideline-specific cross-reference data objects may be used to generate one or more parameters of a predictive machine learning model to generate the prediction outputs for the constrained queries. This technique will lead to higher accuracy of performing predictive operations on unstructured data. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

In some embodiments, the computing system 101 may communicate with at least one of the client computing entity 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may include a predictive data analysis computing entity 106 and one or more external computing entities 108. The predictive data analysis computing entity 106 and/or one or more external computing entities 108 may be individually and/or collectively configured to receive predictive data analysis/query requests from one or more client computing entity 102, process the predictive data analysis/query requests to generate predictions, provide the generated predictions to the one or more client computing entity 102, and automatically initiate performance of prediction-based actions based on the generated predictions.

For example, as discussed in further detail herein, the predictive data analysis computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data analysis and/or training tasks. The storage subsystem may include one or more storage units, such as multiple distributed storage units that are connected through a computer network. Each storage unit in the respective computing entities may store at least one of one or more data assets and/or one or more data about the computed properties of one or more data assets. Moreover, each storage unit in the storage systems may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictive data analysis computing entity 106 and/or one or more external computing entities 108 are communicatively coupled using one or more wired and/or wireless communication techniques. The respective computing entities may be specially configured to perform one or more steps/operations of one or more techniques described herein. By way of example, the predictive data analysis computing entity 106 may be configured to train, implement, use, update, and evaluate machine learning models in accordance with one or more training and/or prediction operations of the present disclosure. In some examples, the external computing entities 108 may be configured to train, implement, use, update, and evaluate machine learning models in accordance with one or more training and/or prediction operations of the present disclosure.

In some example embodiments, the predictive data analysis computing entity 106 may be configured to receive and/or transmit one or more datasets, objects, and/or the like from and/or to the external computing entities 108 to perform one or more steps/operations of one or more techniques (e.g., data extraction techniques, data ranking techniques, and/or the like) described herein. The external computing entities 108, for example, may include and/or be associated with one or more entities that may be configured to receive, transmit, store, manage, and/or facilitate datasets, such as a dataset including structured data and unstructured data. The external computing entities 108, for example, may include data sources that may provide such datasets, and/or the like to the predictive data analysis computing entity 106 which may leverage the datasets to perform one or more steps/operations of the present disclosure, as described herein. In some examples, the datasets may include an aggregation of data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive data analysis computing entity 106 to obtain and aggregate data for a prediction domain.

In some example embodiments, the predictive data analysis computing entity 106 may be configured to receive a trained machine learning model trained and subsequently provided by the one or more external computing entities 108. For example, the one or more external computing entities 108 may be configured to perform one or more training steps/operations of the present disclosure to train a machine learning model, as described herein. In such a case, the trained machine learning model may be provided to the predictive data analysis computing entity 106, which may leverage the trained machine learning model to perform one or more prediction steps/operations of the present disclosure. In some examples, feedback (e.g., evaluation data, ground truth data, etc.) from the use the of the machine learning model may be recorded by the predictive data analysis computing entity 106. In some examples, the feedback may be provided to the one or more external computing entities 108 to continuously train the machine learning model over time. In some examples, the feedback may be leveraged by the predictive data analysis computing entity 106 to continuously train the machine learning model over time. In this manner, the computing system 101 may perform, via one or more combinations of computing entities, one or more prediction, training, and/or any other machine learning-based techniques of the present disclosure.

A. Example Predictive Data Analysis Computing Entity

Figure 2:
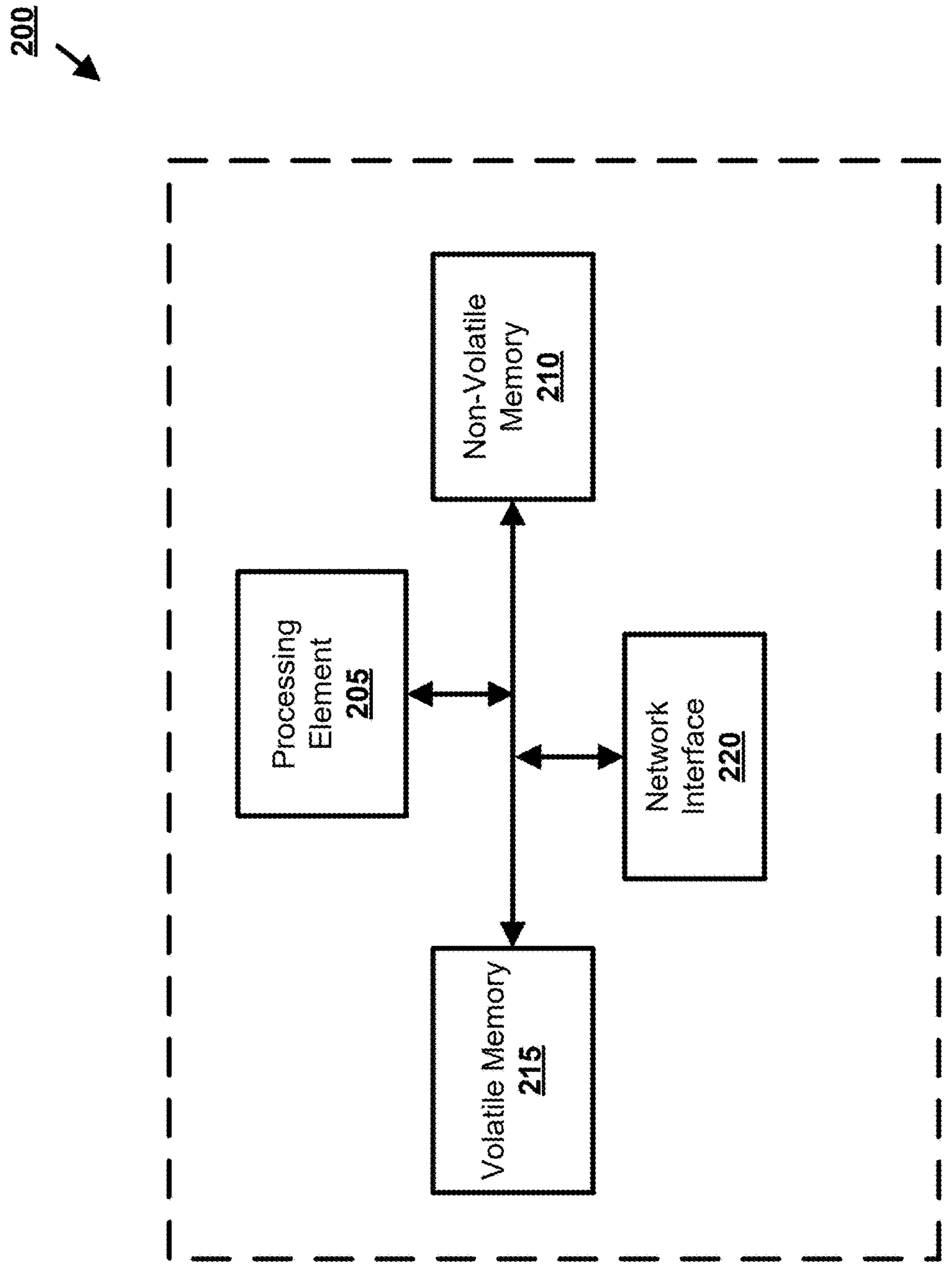
FIG. 2 provides an example predictive data analysis computing entity in accordance with some embodiments of the present disclosure.

FIG. 2 provides an example computing entity 200 in accordance with some embodiments of the present disclosure. The computing entity 200 is an example of the predictive data analysis computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive data analysis computing entity 106, etc.) may train and use one or more machine learning models described herein. In other embodiments, a first computing entity (e.g., predictive data analysis computing entity 106, etc.) may use one or more machine learning models that may be trained by a second computing entity (e.g., external computing entity 108) communicatively coupled to the first computing entity. The second computing entity, for example, may train one or more of the machine learning model(s) described herein, and subsequently provide the trained machine learning model(s) (e.g., optimized parameters, weights, code sets, etc.) to the first computing entity over a network.

As shown in FIG. 2, in some embodiments, the predictive data analysis computing entity 106 may include, or be in communication with, one or more processing elements 205 (also referred to as processor(s), processing circuitry, and/or similar terms used herein interchangeably) that communicate with other elements within the predictive data analysis computing entity 106 via a bus, for example. As will be understood, the processing elements 205 may be embodied in a number of different ways.

For example, the processing elements 205 may be embodied as one or more complex programmable logic devices (CPLDs), microprocessors, multi-core processors, coprocessing entities, application-specific instruction-set processors (ASIPs), microcontrollers, and/or controllers. Further, the processing elements 205 may be embodied as one or more other processing devices or circuitry. The term circuitry may refer to an entirely hardware embodiment or a combination of hardware and computer program products. Thus, the processing elements 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing elements 205 may be configured for a particular use or configured to execute instructions stored in volatile or non-volatile media or otherwise accessible to the processing elements 205. As such, whether configured by hardware or computer program products, or by a combination thereof, the processing elements 205 may be capable of performing steps or operations according to embodiments of the present disclosure when configured accordingly.

In some embodiments, the computing entity 200 may further include, or be in communication with, non-volatile media (also referred to as non-volatile storage, memory, memory storage, memory circuitry, and/or similar terms used herein interchangeably). In some embodiments, the non-volatile media may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile media may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the computing entity 200 may further include, or be in communication with, volatile media (also referred to as volatile storage, memory, memory storage, memory circuitry, and/or similar terms used herein interchangeably). In some embodiments, the volatile media may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like being executed by, for example, the processing elements 205. Thus, the databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like may be used to control certain aspects of the operation of the computing entity 200 with the assistance of the processing elements 205 and operating system.

As indicated, in some embodiments, the computing entity 200 may also include one or more network interfaces 220 for communicating with various computing entities (e.g., the one or more client computing entity 102, external computing entities, etc.), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may include, or be in communication with, one or more input elements, such as a keyboard input, a mouse input, a touch screen/display input, motion input, movement input, audio input, pointing device input, joystick input, keypad input, and/or the like. The computing entity 200 may also include, or be in communication with, one or more output elements (not shown), such as audio output, video output, screen/display output, motion output, movement output, and/or the like.

B. Example Client Computing Entity

Figure 3:
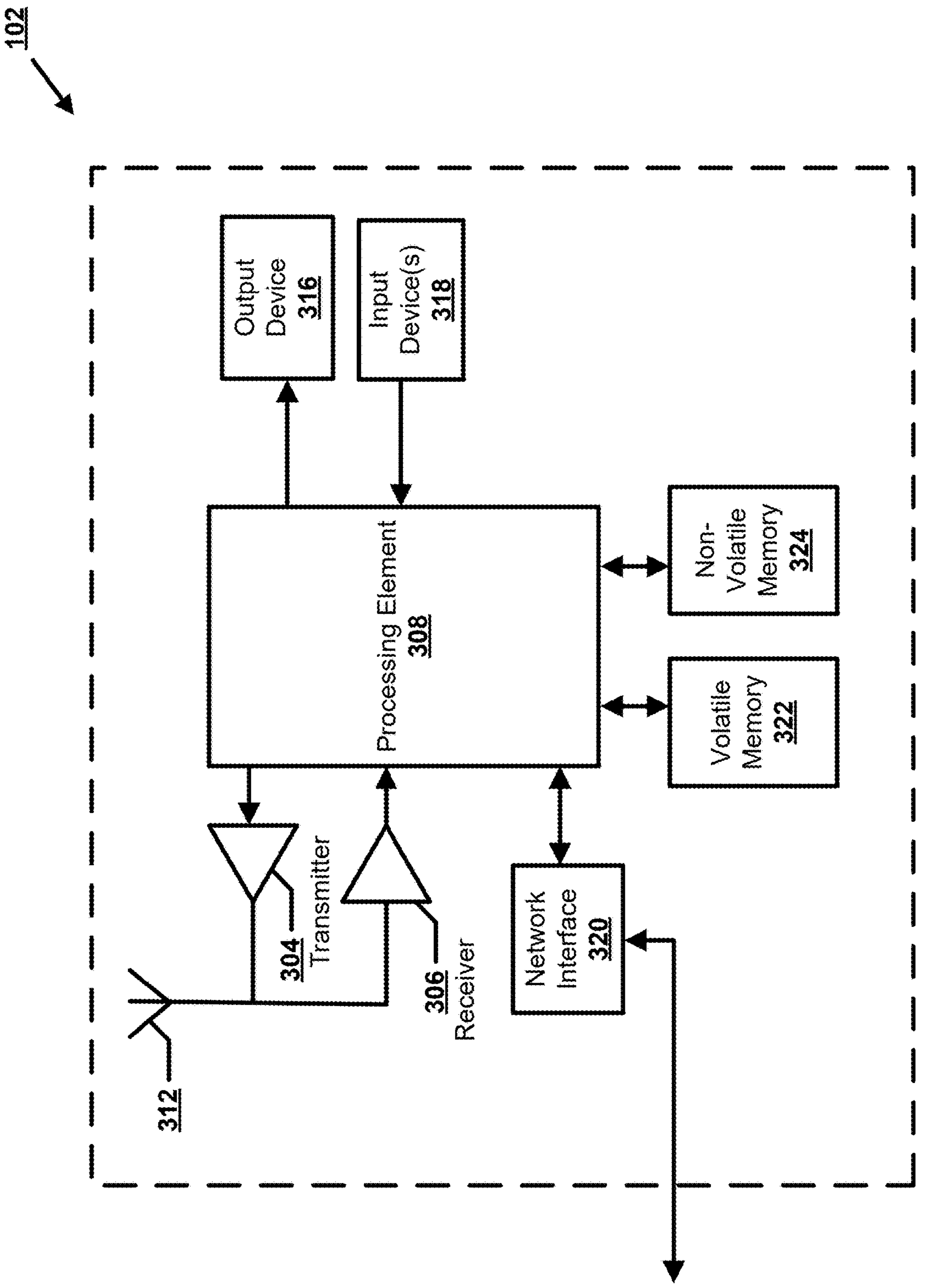
FIG. 3 provides an example client computing entity in accordance with some embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entity 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the computing entity 200. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the computing entity 200 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include an output device 316 (e.g., display, speaker, tactile instrument, etc.) coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the computing entity 200, as described herein. The user input interface may comprise any of a plurality of input devices 318 (or interfaces) allowing the client computing entity 102 to receive code and/or data, such as a keypad (hard or soft), a touch display, voice/speech or motion interfaces, or other input device. In some embodiments including a keypad, the keypad may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like to implement the functions of the client computing entity 102.

As indicated, this may include a user application that is resident on the client computing entity 102 or accessible through a browser or other user interface for communicating with the computing entity 200 and/or various other computing entities.

In another embodiment, the client computing entity 102 may include one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "constrained query" refers to a data construct that describes a prediction request in accordance with guideline data object. A constrained query may comprise one or more words, terms, or a string of characters, numbers, symbols, or any combination thereof, that may be entered by a user and received by an information retrieval system. According to various embodiments of the present disclosure, a constrained query comprises (i) an input unstructured data object that is associated with an entity and (ii) a reference to a guideline data object. In some embodiments, a constrained query comprises one or more instructions for specifying information retrieval. For example, a constrained query may comprise a request for generating one or more prediction outputs for an input unstructured data object in accordance with a guideline data object. In some embodiments, one or more prediction outputs is generated, using a predictive machine learning model, based on a constrained query. According to various embodiments of the present disclosure, a constrained query may be received by a predictive data analysis system from one or more client computing entities, either directly or indirectly via, e.g., an information retrieval system.

In some embodiments, the term "answer" refers to a data construct that describes a predictive output that is generated by a retrieval machine learning model in response to a question, such as a model prompt, that is provided to the retrieval machine learning model. According to various embodiments of the present disclosure, an answer comprises a generative summary of, or at least a portion of, one or more passages (e.g., top-ranking passages) that are extracted from one or more unstructured data objects. In some embodiments, a retrieval machine learning model is configured to generate an answer based on (i) a question from a guideline data object and (i) unstructured data comprising one or more passages that the retrieval machine learning model may generate the answer from.

In some embodiments, the term "passage" refers to a data construct that describes at least a portion of a body of data, such as an unstructured data object. For example, one or more passages may be generated from a body of data by dividing the body of data into one or more segments comprising a predetermined length or size. As such, an amount of passages generated from a body of data may be based on a size of each passage. According to various embodiments of the present disclosure, a passage may be assigned a score based on one or more scoring criteria (e.g., the passage's relevancy, etc.) with respect to a question (e.g., associated with a guideline data object, etc.). In some embodiments, one or more passages are extracted from a plurality of passages of unstructured data object based on one or more scores that are associated with the one or more passages.

In some embodiments, the term "question" refers to a data construct that describes an inquiry, criterion, or step associated with a guideline data object. For example, a guideline data object may comprise a series of questions that are representative of a procedure to be followed in a particular prediction domain. In some embodiments, a question may be represented by a node in a decision tree that is associated with a guideline data object.

In some embodiments, the term "unstructured data object" refers to a data construct that describes data that is not stored in a structured database format and is not organized in a manner that is easily readable and understandable by machine. For example, an unstructured data object may comprise data that doesn't follow a predetermined data model or schema. An unstructured data object may be human generated or machine generated and may comprise textual or a non-textual data. Examples of unstructured data objects comprising textual data may include text documents, electronic messages (e.g., e-mail or short message service (SMS)), survey responses, or transcripts of call center interactions. Other examples of unstructured data objects comprising non-textual data may include images, audio and/or video files, and machine data files (e.g., log files from websites, servers, networks and applications, or data captured from sensors or Internet-of-things (IoT) devices.

In some embodiments, the term "structured data object" refers to a data construct that describes data that is stored in a structured database format and is organized in a manner that is easily readable and understandable by machine. In some embodiments, a structured data object may comprise (i) one or more data elements that are assigned to a specific field or column in a schema and (ii) one or more data records that are associated with the one or more data elements. For example, a structured data object may comprise records that are associated with data elements representative of a name, address, or phone number. In another example, a structured data object may comprise records that are representative of entities (e.g., patients) and associated with data elements representative of procedure codes, diagnosis codes, or lab results.

In some embodiments, the term "entity" refers to a data construct that describes a data object, article, file, program, service, task, operation, computing entity, and/or the like unit that is associated with unstructured and/or structured data objects. In some embodiments, an entity relates to a defined subject that exists in the real-world and/or a virtual environment. According to various embodiments of the present disclosure, an input unstructured data object that is associated with an entity may be analyzed using a predictive machine learning model to generate prediction outputs with respect to the entity.

In some embodiments, the term "guideline data object" refers to a data construct that describes one or more procedures to be adhered by to achieve one or more objectives, targets, or outcomes. For example, a guideline data object may comprise one or more series of steps that are associated with a medical procedure or diagnosis. In some embodiments, a guideline data object comprises nodes and edges that are associated with one or more series of questions in a decision tree, where a path may be advanced to leaf nodes from a root node based on answers (e.g., extracted from unstructured data) to the questions, and one or more terminal nodes that are representative of determining a final decision in compliance with a guideline (e.g., via the nodes and edges).

In some embodiments, the term "parameter" refers to a data construct that describes a variable or value of a machine learning model that is used by the machine learning model to determine how input data is transformed into a prediction output. In some embodiments, one or more parameters of a machine learning model are configured or modified based on training of the machine learning model on training data, such as a labeled training dataset for supervised training techniques. According to various embodiments of the present disclosure, a predictive machine learning model comprises one or more learned parameters that are generated by training the predictive machine learning model based on (i) one or more cross-reference embeddings that are based one or more guideline-specific cross-reference data objects and/or (ii) one or more structured data embeddings that are based on one or more training structured data objects. For example, one or more cross-reference embeddings that are associated with one or more guideline-specific cross-reference data objects and one or more structured data embeddings that are associated with one or more structured data objects may be mapped to a common feature vector space that is used to train (e.g., update one or more parameters of) a predictive machine learning model.

In some embodiments, the term "embedding" refers to a data construct that describes a latent representation of data comprising one or more features. For example, an embedding of data may be expressed as a vector comprising one or more numbers representative of one or more features associated with content of data. In some embodiments, an embedding may be generated by mapping one or more features to one or more elements in a feature vector space. According to various embodiments of the present disclosure, an embedding represents a feature associated with machine learning model input or training data, such as a guideline-specific cross-reference data object. One or more embeddings may be generated for machine learning model input or training data such that the machine learning model input or training data may be provided in a format suitable for analysis or processing by a predictive machine learning model. In some embodiments, one or more embeddings are generated based on term frequency-inverse document frequency, one-hot encoding, or character embeddings.

In some embodiments, the term "guideline-specific cross-reference data object" refers to a data construct that describes data that is extracted from one or more unstructured data objects based on scores of the extracted data with respect to a guideline data object. For example, a guideline-specific cross-reference data object may be representative of a document that comprises portions (e.g., passages) of an unstructured data object that comprise a degree of relevancy to (questions of) a guideline data object. In some embodiments, a guideline-specific cross-reference data object is generated based on (i) one or more training unstructured data objects that are associated with one or more training entities and (ii) a guideline data object. In some embodiments, one or more guideline-specific cross-reference data objects may be used to train (e.g., one or more parameters of) a predictive machine learning model such that specific passages of unstructured data objects that are most relevant to a guideline data object are used to train the predictive machine learning model. In some embodiments, generating a guideline-specific cross-reference data object comprises (i) extracting a first question from a guideline data object, (ii) generating a plurality of passages from one or more training unstructured data objects, (iii) assigning a plurality of scores to the plurality of passages that correspond to the first question, (iv) identifying, for the first questions, one or more top ranking passages from the plurality of passages based on the plurality of scores, (v) generating, using a retrieval machine learning model, one or more answers to the first question based on the one or more top ranking passages, (vi) combining the one or more answers with a plurality of answers that are generated based on one or more second questions from the guideline data object, and (vii) generating the guideline-specific cross-reference data object based on the combination of the one or more answers and the plurality of answers. Accordingly, a guideline-specific cross-reference data object may comprise a plurality of answers generated using a retrieval machine learning model based on a plurality of top ranking passages from one or more training unstructured data objects.

In some embodiments, the term "score" refers to a data construct that describes an order, rating, or rank that is determined based on one or more scoring criteria. For example, a passage may be assigned a score that is based on the passage's relevancy to a question. In another example, a passage may be assigned a score that is based on a similarity measure (e.g., cosine similarity or a distance between embeddings, Jaccard index, or Sorensen-Dice coefficient, etc.) between the passage and a question. According to various embodiments of the present disclosure, generating a guideline-specific cross-reference data object comprises (i) determining one or more top ranking passages from a plurality of passages of an unstructured data object and (ii) generating, using a retrieval machine learning model, one or more answers to a question based on the one or more top ranking passages.

In some embodiments, the term "prediction output" refers to a data construct that describes an output generated by a machine learning model. According to various embodiments of the present disclosure, a prediction output is generated using a predictive machine learning model based on one or more learned parameters that are trained based on (i) one or more cross-reference embeddings that are associated with one or more guideline-specific cross-reference data objects and/or (ii) one or more structured data embeddings that are associated with one or more training structured data objects that are associated with one or more training entities. In some embodiments, a prediction output comprises a classification or label that is representative of one or more actions that may be performed based on a guideline data object, as specified in a constrained query. In some embodiments, a prediction output is generated based on one or more answers, that are identified from an input unstructured data object, to one or more questions that are associated with a guideline data object.

In some embodiments, the term "training data" refers to data used to train a machine learning model to generate prediction outputs or perform prediction tasks. A machine learning model may be configured via one or more parameters to learn (or trained on) features associated with training data. For example, training data may comprise data including example associations between one or more features and respective one or more labels, wherein the one or more labels are representative of ground truth (e.g., actual classification of the one or more features). According to various embodiments of the present disclosure, training data for training a prediction machine learning model comprises (i) one or more cross-reference embeddings that are associated with one or more guideline-specific cross-reference data objects that comprise associations between passages (e.g., from training unstructured data objects) and questions (e.g., from training guideline data objects) and/or (ii) one or more structured data embeddings that are associated with one or more training structured data objects that are labeled based on their representative features. In some embodiments, the one or more cross-reference embeddings and/or the one or more structured data embeddings may be stored with one or more ground truth labels thereby generating one or more training entries which may be used in a labeled training dataset, for example, to train a predictive machine learning model. In some example embodiments, training data may be extracted from or generated based on unstructured or structured data objects (e.g., electronic health record (EHR)/electronic medical records (EMR) or databases) comprising a plurality of data fields comprising codes, descriptions of diagnosis or action, times/dates, or other information.

In some embodiments, the term "predictive machine learning model" refers to a data construct that describes parameters, hyperparameters, and/or defined operations of a machine learning model that is configured to generate one or more prediction outputs for a constrained query. According to various embodiments of the present disclosure, a predictive machine learning model comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages. In some embodiments, a predictive machine learning model comprises one or more learned parameters that are generated and/or trained based on training data that comprises (i) one or more cross-reference embeddings that are associated with one or more guideline-specific cross-reference data objects and/or (ii) one or more structured data embeddings that are associated with one or more training structured data objects that are associated with one or more training entities.

In some embodiments, the predictive machine learning model comprises a supervised machine learning model. For example, the predictive machine learning model may be trained using one or more supervisory training techniques and a labeled training dataset. By way of example, the predictive machine learning model may be trained (e.g., by updating one or more learnable parameters, etc.) using back-propagation of errors to optimize a loss function, such as a classification loss, prediction loss, and/or the like. The loss function, for example, may include a classification loss function (e.g., cross-entropy, etc.) configured to evaluate a predictive accuracy of the predictive machine learning model based on a comparison between one or more training outputs to a plurality of ground truths of the labeled training dataset.

Using some of the techniques of the present disclosure, a feature dense labeled training dataset may be generated to improve the speed and efficiency of training a predictive machine learning model, while reduce memory requirements. The labeled training dataset, for example, may include a plurality of training entries. Each training entry may include a ground truth label that corresponds to training input data. The training input data may traditionally include unstructured and/or structured data for a training entity. Using some of the techniques of the present disclosure, unstructured data of a training entry may be converted to one or more cross-reference embeddings and/or structured data of a training entry may be converted to one or more structured data embeddings, where the one or more cross-reference embeddings and/or the one or more structured data embeddings extract, augment, and combine relevant features from the unstructured and structured data in a common feature vector space. As described herein, the relevant features may be intelligently extracted, augmented, and combined based on their relevance to a guideline data object. The resulting training entries may include labeled embedding pairs that provide dense feature representations for a corresponding ground truth label. In this way, a predictive machine learning model may be trained using a labeled training dataset that is tailored to a plurality of guideline data objects for a particular prediction domain.

In some embodiments, the term "retrieval machine learning model" refers to a data construct that describes parameters, hyperparameters, and/or defined operations of a machine learning model that is configured to perform a task and/or generate an output based on one or more model prompts. For example, a retrieval machine learning model may be configured to generate one or more outputs (e.g., one or more answers) that are responsive to one or more model prompts (e.g., one or more questions). According to various embodiments of the present disclosure, a retrieval machine learning model is configured to generate an output that comprises one or more answers that are responsive to a model prompt comprising a question that is associated with a guideline data object and one or more passages extracted from an unstructured data object. In some embodiments, a retrieval machine learning model is used to generate one or more answers to a question based on one or more top ranking passages that are extracted from one or more unstructured data objects. In some embodiments, a retrieval machine learning model comprises a transformer-based language machine learning model, such as a generative pre-trained transformer. In some embodiments, a retrieval machine learning model may be pre-trained to perform generic prediction tasks and subsequently fine-tuned to perform application-specific prediction tasks. For example, a retrieval machine learning model may comprise a language model that is tailored for certain datasets. In some example embodiments, a retrieval machine learning model is fine-tuned on a plurality of training question-answer pairs (e.g., comprising (i) a plurality of training questions based on one or more guideline data objects and (ii) a plurality of training answers, generated using a retrieval machine learning model, to the plurality of questions that may be based on a plurality of training unstructured data objects).

In some embodiments, the term "model prompt" refers to a data construct that describes information comprising one or more instructions that may be used to interact with a retrieval machine learning model to define a desired task and/or output from the retrieval machine learning model. That is, a model prompt may be used to provide a retrieval machine learning model with information the retrieval machine learning model needs to perform a task or generate an output. For example, a model prompt may comprise a task description and optionally one or more examples to help a retrieval machine learning model understand how to generate an output. In some embodiments, a model prompt comprises a zero-shot model prompt or a few-shot model prompt.

IV. OVERVIEW

Various embodiments of the present disclosure make important technical contributions to predictive text analysis that address the efficiency and reliability shortcomings of existing predictive text analysis technologies. For example, some techniques of the present disclosure improve the predictive accuracy of predictive machine learning models used in generating prediction outputs for constrained queries on unstructured data. To do so, the predictive machine learning models may be trained based on guideline-specific cross-reference data objects that allow for effective handling of lengthy text and/or intricacies associated with unstructured data objects and alignment with guidelines. By doing so, some of the techniques of the present disclosure improve the training speed and training efficiency of training predictive machine learning models while improving the predictive performance of the resulting models.

It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative machine learning model architectures and/or training pipelines. Accordingly, some of the techniques of the present disclosure that improve training speed and/or resource usage (e.g., memory usage, processing usage, etc.) without harming the predictive accuracy of a model, such as the techniques described herein, enable improved machine learning techniques that specifically address challenges in machine learning technology. In doing so, some of the techniques described herein improve efficiency and speed of training predictive machine learning models, thus reducing the number of computational operations needed and/or the amount of training data entries needed to train predictive machine learning models. Accordingly, some of the techniques described herein improve the computational efficiency, storage-wise efficiency, and/or speed of training machine learning models, while improving the model's predictive performance.

Various embodiments of the present disclosure improve predictive accuracy of predictive machine learning models by generating guideline-specific cross-reference data objects. As described herein, information that exists in enterprise systems may encompass unstructured data, such as textual content found within a medical record of a patient's medical history. A significant amount of computing resources may be spent analyzing the unstructured data and comparing them to established guidelines (e.g., to ascertain medical necessity in some example embodiments).

In accordance with various embodiments of the present disclosure, one or more guideline-specific cross-reference data objects are generated for providing prediction outputs that are responsive to constrained queries that comprise (i) an input unstructured data object that is associated with an entity and (ii) a reference to a guideline data object. The one or more guideline-specific cross-reference data objects may be generated by extracting relevant passages from training unstructured data objects based on one or more guideline data objects. The one or more guideline-specific cross-reference data objects may be used to generate one or more parameters of a predictive machine learning model to generate the prediction outputs for the constrained queries. In this manner, some of the techniques of the present disclosure, improve accuracy of performing predictive operations on unstructured data.

In accordance with various embodiments of the present disclosure, unstructured data is processed and/or analyzed based on a guideline data object. By doing so, relevant passages from the unstructured data may be intelligently selected from a plurality of passages and provided as a guideline-specific cross-reference data object that may be used to train (e.g., update one or more parameters of) a predictive machine learning model to generate predictions for input unstructured data objects in accordance with the guideline data object. In this way, some of the techniques of the present disclosure may be practically applied to improve information retrieval based on unstructured data relative to traditional question answering systems.

Moreover, some of the techniques (e.g., the data extraction techniques, data ranking techniques, etc.) of the present disclosure may be applied to improve efficiency and speed of training predictive machine learning models. This, in turn, reduces the number of computational operations needed and/or the amount of training data entries needed to train predictive machine learning models. Accordingly, the techniques described herein improve the computational efficiency, storage-wise efficiency, and/or speed of training predictive machine learning models. Other technical improvements and advantages may be realized by one of ordinary skill in the art.

Examples of technologically advantageous embodiments of the present disclosure include (i) prediction machine learning techniques that leverage natural language model predictions for unstructured data to generate improved predictions, (ii) extraction techniques for determining top ranking passages from unstructured data, and (iii) machine learning training techniques for improving model accuracy while reducing computational resource usage, among others. Other technical improvements and advantages may be realized by one of ordinary skill in the art.

V. EXAMPLE SYSTEM OPERATIONS

As indicated, various embodiments of the present disclosure make important technical contributions to improving the predictive accuracy of predictive machine learning models by generating guideline-specific cross-reference data objects. By doing so, relevant passages from the unstructured data may be intelligently selected from a plurality of passages and provided as a guideline-specific cross-reference data object that may be used to train (e.g., update one or more parameters of) a predictive machine learning model to generate predictions for input unstructured data objects in accordance with the guideline data object. In this way, some of the techniques of the present disclosure may be practically applied to improve information retrieval based on unstructured data relative to traditional question answering systems.

Figure 4:
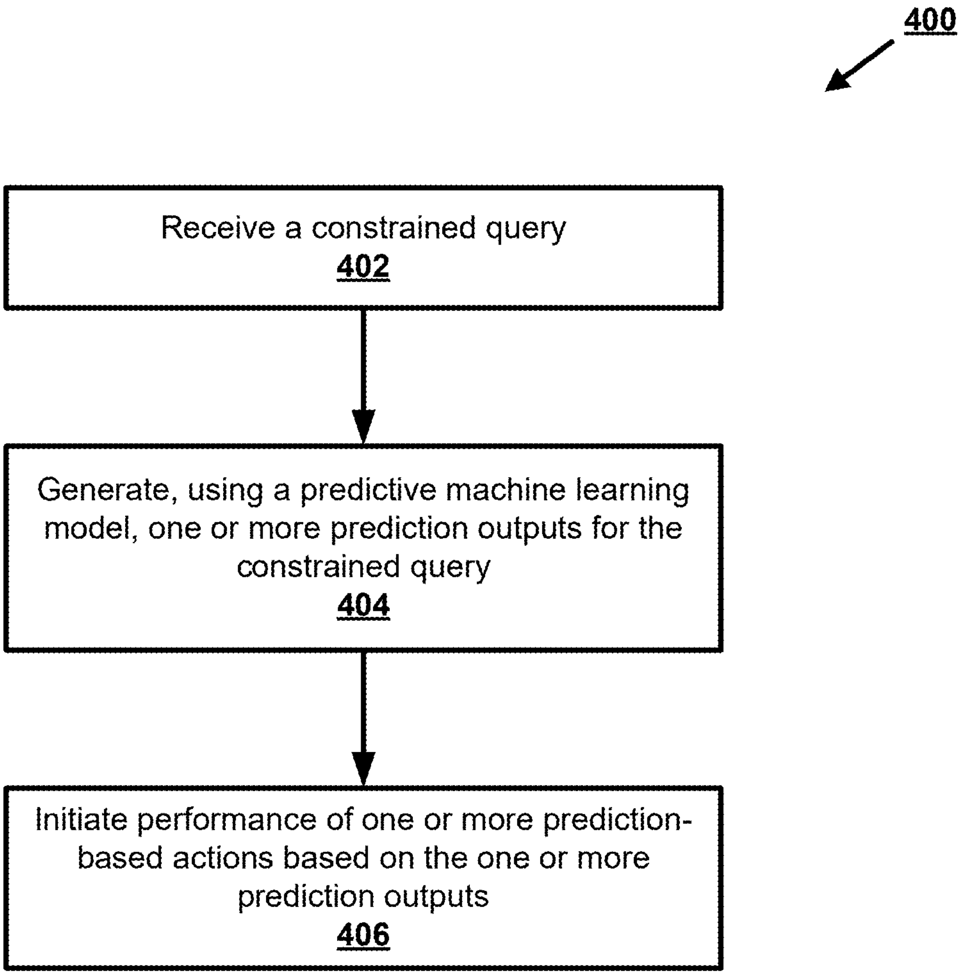
FIG. 4 is a flowchart diagram of an example process for processing constrained queries in accordance with some embodiments of the present disclosure.

FIG. 4 is a flowchart diagram of an example process 400 for processing constrained queries in accordance with some embodiments of the present disclosure.

In some embodiments, via the various steps/operations of the process 400, the computing entity 200 may generate a guideline-specific cross-reference data object, train a predictive machine learning model based on the guideline-specific cross-reference data object, and use the predictive machine learning model to generate one or more prediction outputs for a constrained query.

In some embodiments, the process 400 begins at step/operation 402 when the computing entity 200 receives a constrained query. According to various embodiments of the present disclosure, a constrained query may be received by computing system 101 and/or computing entity 200 from one or more client computing entity 102, either directly or indirectly via, e.g., an information retrieval system comprising a search engine.

In some embodiments, a constrained query describes a prediction request in accordance with guideline data object. A constrained query may comprise one or more words, terms, or a string of characters, numbers, symbols, or any combination thereof, that may be entered by a user and received by an information retrieval system. According to various embodiments of the present disclosure, a constrained query comprises (i) an input unstructured data object that is associated with an entity and (ii) a reference to a guideline data object. In some embodiments, a constrained query comprises one or more instructions for specifying information retrieval. For example, a constrained query may comprise a request for generating one or more prediction outputs for an input unstructured data object in accordance with a guideline data object. According to various embodiments of the present disclosure, a constrained query may be received by a predictive data analysis system from one or more client computing entities, either directly or indirectly via, e.g., an information retrieval system.

In some embodiments, a guideline data object describes to a data construct that describes one or more procedures to be adhered by to achieve one or more objectives, targets, or outcomes. For example, a guideline data object may comprise one or more series of steps that are associated with a medical procedure or diagnosis. In some embodiments, a guideline data object comprises nodes and edges that are associated with one or more series of questions in a decision tree, where a path may be advanced to leaf nodes from a root node based on answers (e.g., extracted from unstructured data) to the questions, and one or more terminal nodes that are representative of determining a final decision in compliance with a guideline (e.g., via the nodes and edges).

In some embodiments, an unstructured data object describes data that is not stored in a structured database format and is not organized in a manner that is easily readable and understandable by machine. For example, an unstructured data object may comprise data that doesn't follow a predetermined data model or schema. An unstructured data object may be human generated or machine generated and may comprise textual or a non-textual data. Examples of unstructured data objects comprising textual data may include text documents, electronic messages (e.g., e-mail or short message service (SMS)), survey responses, or transcripts of call center interactions. Other examples of unstructured data objects comprising non-textual data may include images, audio and/or video files, and machine data files (e.g., log files from websites, servers, networks and applications, or data captured from sensors or Internet-of-things (IoT) devices.

In some embodiments, an entity describes a data object, article, file, program, service, task, operation, computing entity, and/or the like unit that is associated with unstructured and/or structured data objects. In some embodiments, an entity relates to a defined subject that exists in the real-world and/or a virtual environment. According to various embodiments of the present disclosure, an input unstructured data object that is associated with an entity may be analyzed using a predictive machine learning model to generate prediction outputs with respect to the entity.

In some embodiments, at step/operation 404, the computing entity 200 generates, using a predictive machine learning model, one or more prediction outputs based on the constrained query.

In some embodiments, the predictive machine learning model comprises a supervised machine learning model. For example, the predictive machine learning model may be trained using one or more supervisory training techniques and a labeled training dataset. By way of example, the predictive machine learning model may be trained (e.g., by updating one or more learnable parameters, etc.) using back-propagation of errors to optimize a loss function, such as a classification loss, prediction loss, and/or the like. The loss function, for example, may include a classification loss function (e.g., cross-entropy, etc.) configured to evaluate a predictive accuracy of the predictive machine learning model based on a comparison between one or more training outputs to a plurality of ground truths of the labeled training dataset.

Using some of the techniques of the present disclosure, a feature dense labeled training dataset may be generated to improve the speed and efficiency of training a predictive machine learning model, while reduce memory requirements. The labeled training dataset, for example, may include a plurality of training entries. Each training entry may include a ground truth label that corresponds to training input data. The training input data may traditionally include unstructured and/or structured data for a training entity. Using some of the techniques of the present disclosure, unstructured data of a training entry may be converted to one or more cross-reference embeddings and/or structured data of a training entry may be converted to one or more structured data embeddings, where the one or more cross-reference embeddings and/or the one or more structured data embeddings extract, augment, and combine relevant features from the unstructured and structured data in a common feature vector space. As described herein, the relevant features may be intelligently extracted, augmented, and combined based on their relevance to a guideline data object. The resulting training entries may include labeled embedding pairs that provide dense feature representations for a corresponding ground truth label. In this way, a predictive machine learning model may be trained using a labeled training dataset that is tailored to a plurality of guideline data objects for a particular prediction domain.

According to various embodiments of the present disclosure, a predictive machine learning model comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages. In some embodiments, the predictive machine learning model comprises one or more learned parameters that are generated by (i) generating a guideline-specific cross-reference data object that is associated with the guideline data object and (ii) generating one or more cross-reference embeddings based on the guideline-specific cross-reference data object. In some embodiments, a predictive machine learning model comprises one or more learned parameters that are generated and/or trained based on training data that comprises (i) one or more cross-reference embeddings that are associated with one or more guideline-specific cross-reference data objects and/or (ii) one or more structured data embeddings that are associated with one or more training structured data objects that are associated with one or more training entities. For example, one or more cross-reference embeddings that are associated with one or more guideline-specific cross-reference data objects and one or more structured data embeddings that are associated with one or more training structured data objects may be mapped to a common feature vector space that is used to train (e.g., update one or more parameters of) a predictive machine learning model.

In some embodiments, a parameter describes a variable or value of a machine learning model that is used by the machine learning model to determine how input data is transformed into a prediction output. In some embodiments, one or more parameters of a machine learning model are configured or modified based on training of the machine learning model on training data.

In some embodiments, an embedding describes a latent representation of data comprising one or more features. For example, an embedding of data may be expressed as a vector comprising one or more numbers representative of one or more features associated with content of data. In some embodiments, an embedding may be generated by mapping one or more features to one or more elements in a feature vector space. According to various embodiments of the present disclosure, an embedding represents a feature associated with machine learning model input or training data, such as a guideline-specific cross-reference data object. One or more embeddings may be generated for machine learning model input or training data such that the machine learning model input or training data may be provided in a format suitable for analysis or processing by a predictive machine learning model. In some embodiments, one or more embeddings are generated based on term frequency-inverse document frequency, one-hot encoding, or character embeddings.

In some embodiments, training data describes data used to train a machine learning model to generate prediction outputs or perform prediction tasks. A machine learning model may be configured via one or more parameters to learn (or trained on) features associated with training data. For example, training data may comprise data including example associations between one or more features and respective one or more labels, wherein the one or more labels are representative of ground truth (e.g., actual classification of the one or more features). According to various embodiments of the present disclosure, training data for training a prediction machine learning model comprises (i) one or more cross-reference embeddings that are associated with one or more guideline-specific cross-reference data objects that comprise associations between passages (e.g., from training unstructured data objects) and questions (e.g., from training guideline data objects) and/or (ii) one or more structured data embeddings that are associated with one or more training structured data objects that are labeled based on their representative features.

In some embodiments, the one or more cross-reference embeddings and/or the one or more structured data embeddings may be stored with one or more ground truth labels thereby generating one or more training entries which may be used in a labeled training dataset, for example, to train a predictive machine learning model. In some example embodiments, training data may be extracted from or generated based on unstructured or structured data objects (e.g., EHR/EMR or databases) comprising a plurality of data fields comprising codes, descriptions of diagnosis or action, times/dates, or other information.

In some embodiments, a prediction output describes an output generated by a machine learning model. According to various embodiments of the present disclosure, a prediction output is generated using a predictive machine learning model based on one or more learned parameters that are associated with (i) one or more cross-reference embeddings of one or more guideline-specific cross-reference data objects and/or (ii) one or more structured data embeddings of one or more training structured data objects that are associated with one or more training entities. In some embodiments, a prediction output comprises a classification or label that is representative of one or more actions that may be performed based on a guideline data object, as specified in a constrained query. In some embodiments, a prediction output is generated based on one or more answers, that are identified from an input unstructured data object, to one or more questions that are associated with a guideline data object.

In some embodiments, a guideline-specific cross-reference data object describes data that is extracted from one or more unstructured data objects based on scores of the extracted data with respect to a guideline data object. For example, a guideline-specific cross-reference data object may be representative of a document that comprises portions (e.g., passages) of an unstructured data object that comprise a degree of relevancy to (questions of) a guideline data object. In some embodiments, one or more guideline-specific cross-reference data objects may be used to train a predictive machine learning model such that specific passages of unstructured data objects that are most relevant to a guideline data object are used to train the predictive machine learning model. In some embodiments, a guideline-specific cross-reference data object is generated based on (i) one or more training unstructured data objects that are associated with one or more training entities and (ii) a guideline data object. Generating a guideline-specific cross-reference data object is described in further detail with respect to the description of FIG. 5.

In some embodiments, a structured data object describes data that is stored in a structured database format and is organized in a manner that is easily readable and understandable by machine. In some embodiments, a structured data object may comprise (i) one or more data elements that are assigned to a specific field or column in a schema and (ii) one or more data records that are associated with the one or more data elements. For example, a structured data object may comprise records that are associated with data elements representative of a name, address, or phone number. In another example, a structured data object may comprise records that are representative of entities (e.g., patients) and associated with data elements representative of procedure codes, diagnosis codes, or lab results.

In some embodiments, at step/operation 406, the computing entity 200 initiates performance of one or more prediction-based actions based on the one or more prediction outputs. In some embodiments, the constrained query comprises a prediction request for assessment of an input unstructured data object based on a guideline data object, the one or more prediction outputs comprise one or more classifications or labels for the input unstructured data object, and the performance of the prediction-based actions are initiated based on the classifications or labels. In some embodiments, initiating the performance of the one or more prediction-based actions based on the one or more prediction outputs includes displaying the one or more classifications or labels for the input unstructured data object using a prediction output user interface. According to some alternative embodiments, initiating the performance of the one or more prediction-based actions based on the one or more prediction outputs comprises, for example, performing a resource-based action (e.g., allocation of resource), generating a diagnostic report, generating and/or executing action scripts, generating alerts or messages, or generating one or more electronic communications. The one or more prediction-based actions may further include displaying visual renderings of the aforementioned examples of prediction-based actions in addition to values, charts, and representations associated with the one or more prediction outputs using a prediction output user interface.

Figure 5:
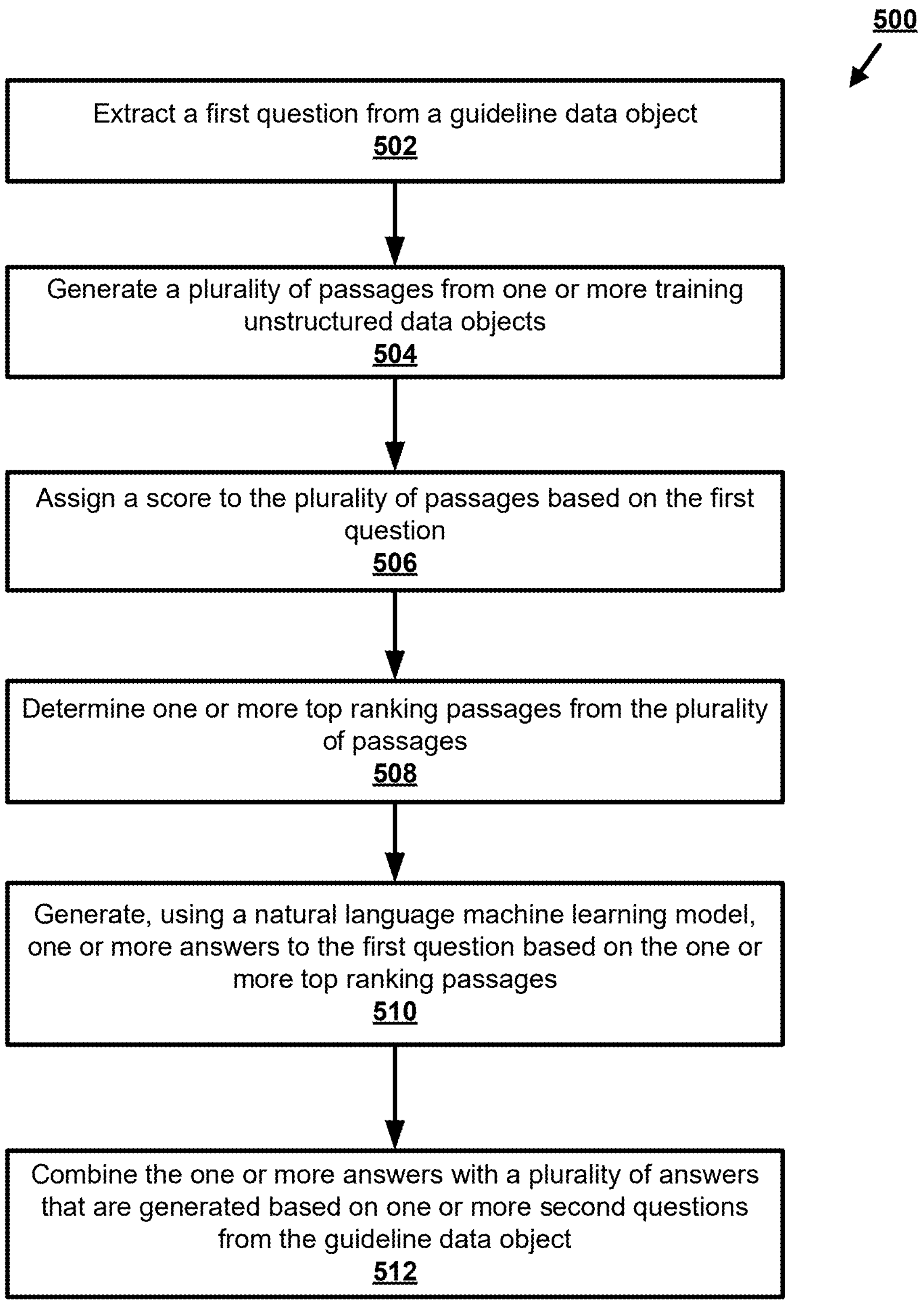
FIG. 5 is a flowchart diagram of an example process for generating a guideline-specific cross-reference data object in accordance with some embodiments of the present disclosure.

FIG. 5 is a flowchart diagram of an example process 500 for generating a guideline-specific cross-reference data object in accordance with some embodiments of the present disclosure.

In some embodiments, the process 500 begins at step/operation 502 when the computing entity 200 extracts a first question from a guideline data object. In some embodiments, a question describes an inquiry, criterion, or step associated with a guideline data object. For example, a guideline data object may comprise a series of questions that are representative of a procedure to be followed. In some embodiments, a question may be represented by a node in a decision tree that is associated with a guideline data object. According to various embodiments of the present disclosure, a question from a guideline data object may be used to extract one or more passages from a plurality of passages that are associated with an unstructured data object.

In some embodiments, at step/operation 504, the computing entity 200 generates a plurality of passages from one or more training unstructured data objects. In some embodiments, a passage describes at least a portion of a body of data, such as an unstructured data object. For example, one or more passages may be generated from a body of data by dividing the body of data into one or more segments comprising a predetermined length or size. As such, an amount of passages generated from a body of data may be based on a size of each passage.

In some embodiments, at step/operation 506, the computing entity 200 assigns a score to the plurality of passages based on the first question. According to various embodiments of the present disclosure, a passage may be assigned a score based on one or more criteria (e.g., the passage's relevancy) with respect to a question (e.g., associated with a guideline data object).

In some embodiments, a score describes an order, rating, or rank that is determined based on one or more scoring criteria. For example, a passage may be assigned a score that is based on the passage's relevancy to a question. In another example, a passage may be assigned a score that is based on a similarity measure (e.g., cosine similarity or a distance between embeddings, Jaccard index, or Sørensen-Dice coefficient) between the passage and a question.

In some embodiments, at step/operation 508, the computing entity 200 determines one or more top ranking passages from the plurality of passages. The one or more top ranking passages may be representative as the most relevant passages of the one or more training unstructured data objects with respect to the first question.

Figure 6:
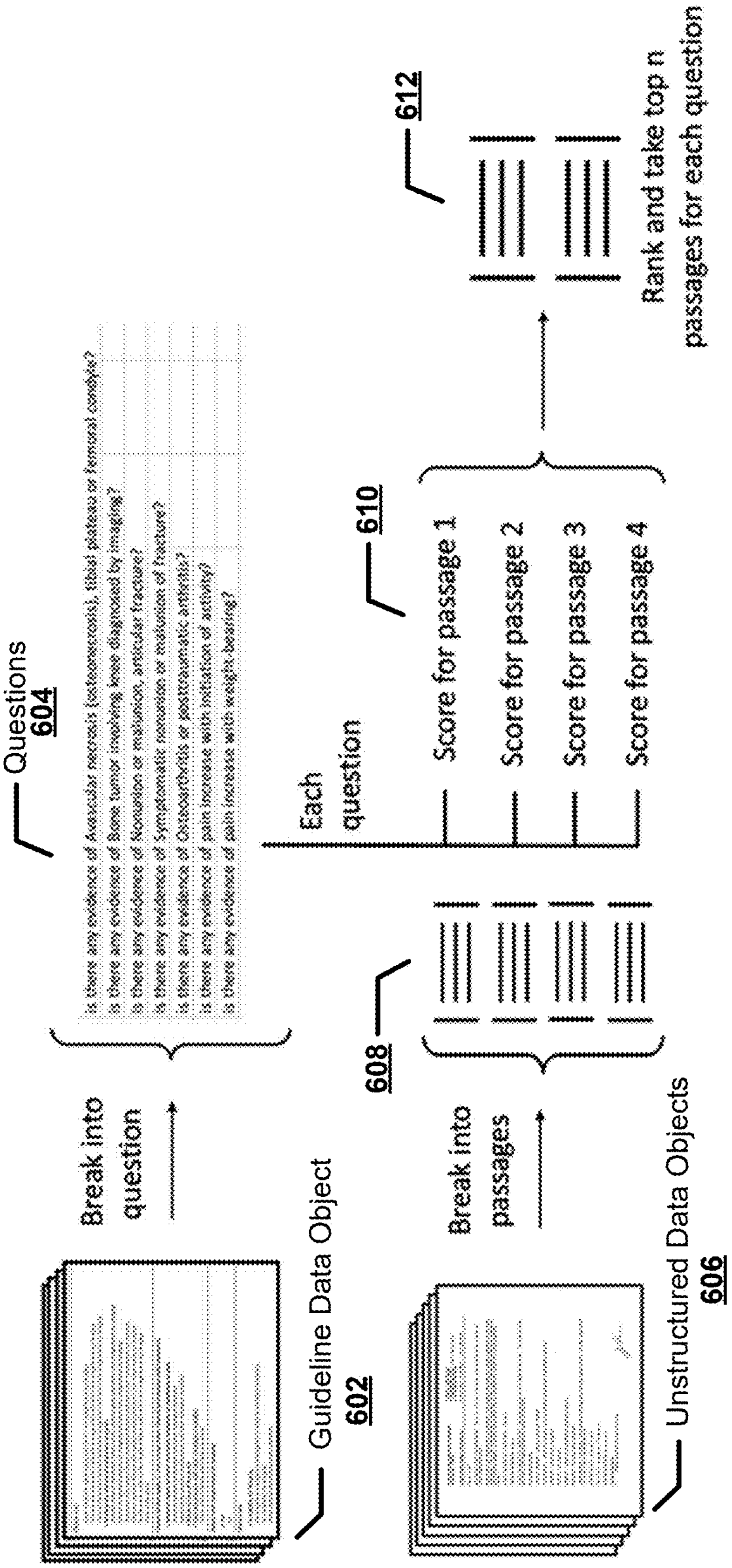
FIG. 6 is an operational example of passage extraction in accordance with some embodiments of the present disclosure.

FIG. 6 is an operational example of passage extraction in accordance with some embodiments of the present disclosure. A guideline data object 602 may comprise one or more series of procedures of which questions 604 are parsed. Unstructured data objects 606 may comprise one or more training unstructured data objects. The unstructured data objects 606 are partitioned into a plurality of passages 608. Passage scores 610 are assigned to the plurality of passages 608 with respect to each of the questions 604. The plurality of passages 608 may be ranked for each of the questions 604 based on the passage scores 610. Top ranking passages 612 comprising, for example, top n ranking ones of the passage scores 610 may be selected for each of the questions 604.

Returning to FIG. 5, in some embodiments, at step/operation 510, the computing entity 200 generates, using a retrieval machine learning model, one or more answers to the first question based on the one or more top ranking passages. In some embodiments, the one or more answers to the first question may be generated by extracting the one or more top ranking passages from the one or more training unstructured data objects and providing the one or more top ranking passages to the retrieval machine learning model. The retrieval machine learning model may select one or more passages from the one or more top ranking passages to generate the one or more answers. In some alternative embodiments, generating the one or more answers to the first question may comprise providing at least a portion (e.g., top ranking) of the plurality of passages to the retrieval machine learning model and generating a summary of a specific requested length.

In some embodiments, a retrieval machine learning model describes parameters, hyperparameters, and/or defined operations of a machine learning model that is configured to perform a task and/or generate an output based on one or more model prompts. For example, a retrieval machine learning model may be configured to generate one or more outputs (e.g., one or more answers) that are responsive to one or more model prompts (e.g., one or more questions).

In some embodiments, a model prompt describes information comprising one or more instructions that may be used to interact with a retrieval machine learning model, to define a desired task and/or output from the retrieval machine learning model. That is, a model prompt may be used to provide a retrieval machine learning model with information the retrieval machine learning model needs to perform a task or generate an output. For example, a model prompt may comprise a task description and optionally one or more examples to help a retrieval machine learning model understand how to generate an output. In some embodiments, a model prompt comprises a zero-shot model prompt or a few-shot model prompt.

According to various embodiments of the present disclosure, a retrieval machine learning model is configured to generate an output that comprises one or more answers that are responsive to a model prompt comprising a question (e.g., the first question) that is associated with a guideline data object and one or more passages extracted from an unstructured data object. In some embodiments, a retrieval machine learning model is used to generate one or more answers to a question based on one or more top ranking passages that are extracted from one or more unstructured data objects. In some embodiments, (i) a model prompt is generated based on (a) a question that is associated with guideline data object and (b) one or more top ranking passages and (ii) the model prompt is provided to a retrieval machine learning model to generate one or more answers.

In some embodiments, an answer describes a predictive output that is generated by a retrieval machine learning model in response to a question, such as a model prompt, that is provided to the retrieval machine learning model. According to various embodiments of the present disclosure, an answer comprises a generative summary of, or at least a portion of, one or more passages (e.g., top-ranking passages) that are extracted from one or more unstructured data objects. In some embodiments, a retrieval machine learning model is configured to generate an answer based on (i) a question from a guideline data object and (i) unstructured data comprising one or more passages that the retrieval machine learning model may generate the answer from. According to various embodiments of the present disclosure, an answer is associated with one or more passages that are extracted from a plurality of passages of an unstructured data object and comprises a top n rank among the plurality of passages with respect to a question (e.g., that is associated with a guideline data object).

In some embodiments, a retrieval machine learning model comprises a transformer-based language machine learning model, such as a generative pre-trained transformer. In some embodiments, a retrieval machine learning model may be pre-trained to perform generic prediction tasks and subsequently fine-tuned to perform application-specific prediction tasks. For example, a retrieval machine learning model may comprise a language model that is tailored for certain datasets. In some example embodiments, a retrieval machine learning model is fine-tuned on a plurality of question-answer pairs (e.g., comprising (i) a plurality of training questions based on one or more guideline data objects and (ii) a plurality of training answers, generated using a retrieval machine learning model, to the plurality of questions that may be based on a plurality of training unstructured data objects).

In some embodiments, at step/operation 512, the computing entity 200 combines the one or more answers with a plurality of answers that are generated based on one or more second questions from the guideline data object. Accordingly, a guideline-specific cross-reference data object may be generated based on the combination of the one or more answers for the first question and the plurality of answers for the one or more second questions. Various alternative approaches may be employed to consolidate the answers and generate a condensed text (e.g., a guideline-specific cross-reference data object), which may be used for one or more downstream tasks. As described herein, a guideline-specific cross-reference data object may be representative of a document that comprises information (e.g., answers to questions of a guideline data object) that is based on one or more passages extracted from one or more unstructured data objects. Accordingly, a guideline-specific cross-reference data object may be used in a downstream task, such as a prediction task, or an answer retrieval task. For example, a guideline-specific cross-reference data object comprising answers to questions may be directly accessed rather than having to extract passages from unstructured data to obtain the same answers for each downstream task operation.

Figure 7:
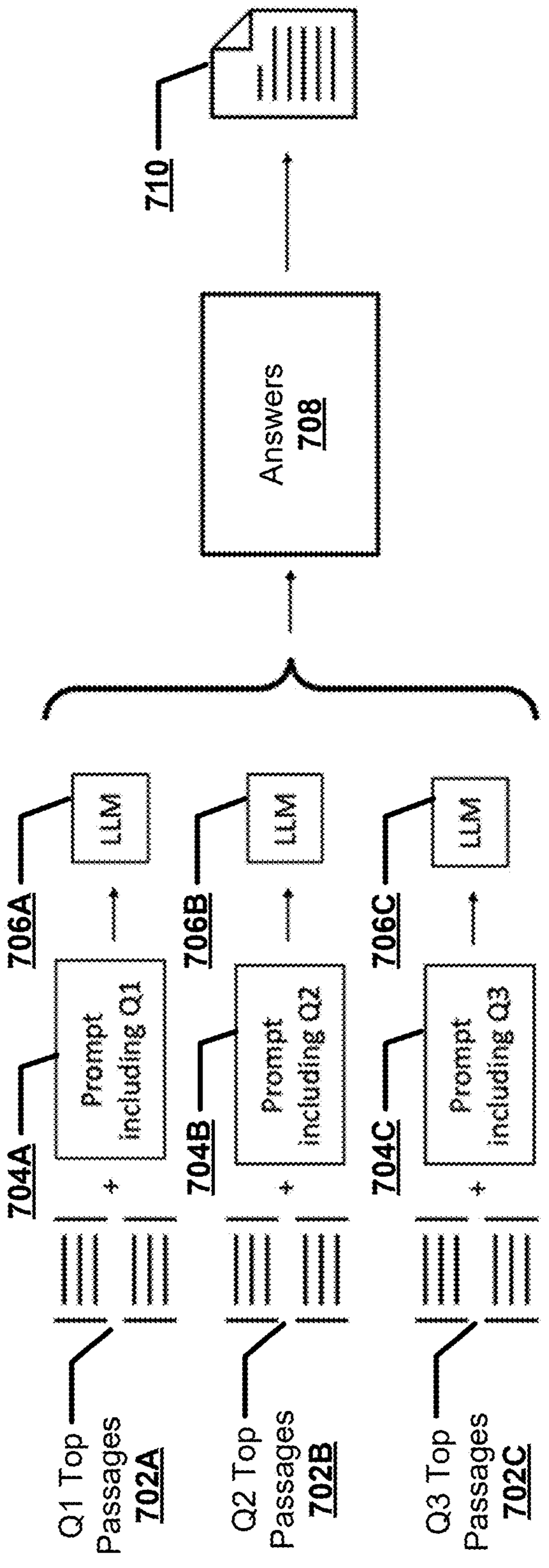
FIG. 7 is an operational example of combining passages extracted from unstructured data objects into a guideline-specific cross-reference data object in accordance with some embodiments of the present disclosure.

FIG. 7 is an operational example of combining passages extracted from unstructured data objects into a guideline-specific cross-reference data object in accordance with some embodiments of the present disclosure. As depicted in FIG. 7, Q1 top passages 702A, Q2 top passages 702B, and Q3 top passages 702C and respective model prompts 704A, 704B, and 704C may be provided to large language model (LLM) 706A, 706B, and 706C. Q1 top passages 702A may be representative of one or more passages from an unstructured data object that comprise top scores for a first question of a guideline data object. Q2 top passages 702B may be representative of one or more passages from an unstructured data object that comprise top scores for a second question of a guideline data object. Q3 top passages 702C may be representative of one or more passages from an unstructured data object that comprise top scores for a third question of a guideline data object.

Model prompts 704A, 704B, and 704C may comprise instructions for requesting answers to questions that are associated with Q1 top passages 702A, Q2 top passages 702B, and Q3 top passages 702C, respectively. Accordingly, LLM 706A, 706B, and 706C may respectively generate answers based on top passages 702A, 702B, and 702C and respective model prompts 704A, 704B, and 704C. In accordance with some embodiments of the present disclosure, LLM 706A, 706B, and 706C may comprise one or more machine learning models or instances of a machine learning model. For example, LLM 706A, 706B, and 706C may comprise a single LLM or a plurality of distinct LLMs. Answers 708 may comprise a combination of answers generated by the LLM 706A, 706B, and 706C. A guideline-specific cross-reference data object 710 may be generated from the answers 708.

Accordingly, as described above, various embodiments of the present disclosure make important technical contributions to improving the predictive accuracy of predictive machine learning models by generating guideline-specific cross-reference data objects. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative machine learning model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

Some techniques of the present disclosure enable the generation of prediction outputs that may be used to initiate one or more predictive actions to achieve real-world effects. The guideline-specific cross-reference data object generation techniques of the present disclosure may be used, applied, and/or otherwise leveraged to generate a predictive machine learning model, which may help in the computer interpretation of unstructured data. The predictive machine learning model of the present disclosure may be leveraged to initiate the performance of various computing tasks that improve the performance of a computing system (e.g., a computer itself, etc.) with respect to various predictive actions performed by the computing entity 200, such as one or more actions that may be performed based on a guideline data object, as specified in a constrained query. Example predictive actions may include the performance of a resource-based action (e.g., allocation of resource), generating a diagnostic report, generating and/or executing action scripts, generating alerts or messages, or generating one or more electronic communications.

In some examples, the computing tasks may include predictive actions that may be based on a prediction domain. A prediction domain may include any environment in which computing systems may be applied to achieve real-word insights, such as predictions (e.g., abstractive summaries, predictive intents, etc.), and initiate the performance of computing tasks, such as predictive actions (e.g., updating user preferences, providing account information, cancelling an account, adding an account, etc.) to act on the real-world insights. These predictive actions may cause real-world changes, for example, by controlling a hardware component, providing alerts, interactive actions, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

In some embodiments, the guideline-specific cross-reference data object generation techniques of process 500 are applied to enable initiation of the performance of one or more predictive actions. A predictive action may depend on the prediction domain. In some examples, the computing entity 200 may leverage the guideline-specific cross-reference data object generation techniques to generate a predictive machine learning model that may be leveraged to initiate the performance of one or more actions based on a guideline data object specified in a constrained query.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may include a single computing entity that is configured to perform all of the steps/operations of a particular example. In addition, or alternatively, a computing system may include multiple dedicated computing entities that are respectively configured to perform one or more of the steps/operations of a particular example. By way of example, the multiple dedicated computing entities may coordinate to perform all of the steps/operations of a particular example.

Example 1. A computer-implemented method comprising: receiving, by one or more processors, a constrained query that comprises (i) an input unstructured data object that is associated with an entity and (ii) a reference to a guideline data object; generating, by the one or more processors, one or more prediction outputs for the constrained query using a predictive machine learning model that comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages, (ii) generating one or more cross-reference embeddings based on the guideline-specific cross-reference data object, and (iii) training the one or more learned parameters using the one or more cross-reference embeddings; and initiating, by the one or more processors, the performance of one or more prediction-based actions based on the one or more prediction outputs.

Example 2. The computer-implemented method of example 1, wherein the one or more training unstructured data objects are associated with one or more training entities and the guideline data object.

Example 3. The computer-implemented method of example 2, wherein generating the guideline-specific cross-reference data object further comprises: generating, using a retrieval machine learning model, one or more answers to the question based on the one or more top ranking passages; and combining the one or more answers to the question with a plurality of answers to the other questions of the one or more questions from the guideline data object.

Example 4. The computer-implemented method of example 3, further comprising: generating a model prompt comprising the question and the one or more top ranking passages; and providing the model prompt to the retrieval machine learning model to generate the one or more answers to the question based on the one or more top ranking passages.

Example 5. The computer-implemented method of any of the preceding examples further comprising: generating one or more structured data embeddings based on one or more training structured data objects corresponding to the one or more training unstructured data objects; and mapping the one or more cross-reference embeddings and the one or more structured data embeddings to a common feature vector space that is used to train the one or more learned parameters.

Example 6. The computer-implemented method of any of the preceding examples, wherein the predictive machine learning model comprises a supervised machine learning model that is trained using a labeled training dataset that comprises (i) one or more ground truth labels and (ii) the one or more cross-reference embeddings or the one or more structured data embeddings.

Example 7. The computer-implemented method of any of the preceding examples, further comprising generating the one or more cross-reference embeddings based on term frequency-inverse document frequency, one-hot encoding, or character embeddings.

Example 8. The computer-implemented method of any of the preceding examples, wherein the guideline data object comprises a decision tree that is associated with one or more series of questions.

Example 9. A computing system comprising memory and one or more processors communicatively coupled to the memory, the one or more processors configured to: receive a constrained query that comprises (i) an input unstructured data object that is associated with an entity and (ii) a reference to a guideline data object; generate one or more prediction outputs for the constrained query using a predictive machine learning model that comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages, (ii) generating one or more cross-reference embeddings based on the guideline-specific cross-reference data object, and (iii) training the one or more learned parameters using the one or more cross-reference embeddings; and initiate the performance of one or more prediction-based actions based on the one or more prediction outputs.

Example 10. The computing system of example 9, wherein the one or more training unstructured data objects are associated with one or more training entities and the guideline data object.

Example 11. The computing system of example 10, wherein the one or more processors are further configured to: generate, using a retrieval machine learning model, one or more answers to the question based on the one or more top ranking passages; and combine the one or more answers to the question with a plurality of answers to other questions of the one or more questions from the guideline data object.

Example 12. The computing system of example 11, wherein the one or more processors are further configured to: generate a model prompt comprising the question and the one or more top ranking passages; and provide the model prompt to the retrieval machine learning model to generate the one or more answers to the question based on the one or more top ranking passages.

Example 13. The computing system of any of examples 9 through 12, wherein the predictive machine learning model comprises a supervised machine learning model that is trained using a labeled training dataset that comprises (i) one or more ground truth labels and (ii) the one or more cross-reference embeddings or one or more structured data embeddings.

Example 14. The computing system of any of examples 9 through 13, wherein the one or more processors are further configured to generate the one or more cross-reference embeddings based on term frequency-inverse document frequency, one-hot encoding, or character embeddings.

Example 15. The computing system of any of examples 9 through 14, wherein the guideline data object comprises a decision tree that is associated with one or more series of questions.

Example 16. One or more non-transitory computer-readable storage media including instructions that, when executed by one or more processors, cause the one or more processors to: receive a constrained query that comprises (i) an input unstructured data object that is associated with an entity and (ii) a reference to a guideline data object; generate one or more prediction outputs for the constrained query using a predictive machine learning model that comprises one or more learned parameters previously trained by: (i) generating a guideline-specific cross-reference data object for the guideline data object by: (a) extracting one or more questions from the guideline data object, (b) assigning a plurality of scores to a plurality of passages from one or more training unstructured data objects that correspond to the one or more questions, (c) identifying, for a question of the one or more questions, one or more top ranking passages from the plurality of passages based on the plurality of scores, and (d) generating the guideline-specific cross-reference data object based on the one or more top ranking passages, (ii) generating one or more cross-reference embeddings based on the guideline-specific cross-reference data object, and (iii) training the one or more learned parameters using the one or more cross-reference embeddings; and initiate the performance of one or more prediction-based actions based on the one or more prediction outputs.

Example 17. The one or more non-transitory computer-readable storage media of example 16 wherein the one or more training unstructured data objects are associated with one or more training entities and the guideline data object.

Example 18. The one or more non-transitory computer-readable storage media of example 17 further including instructions that, when executed by the one or more processors, cause the one or more processors to: generate, using a retrieval machine learning model, one or more answers to the question based on the one or more top ranking passages; and combine the one or more answers to the question with a plurality of answers to other questions of the one or more questions from the guideline data object.

Example 19. The one or more non-transitory computer-readable storage media of example 18 further including instructions that, when executed by the one or more processors, cause the one or more processors to: generate a model prompt comprising the question and the one or more top ranking passages; and provide the model prompt to the retrieval machine learning model to generate the one or more answers to the question based on the one or more top ranking passages.

Example 20. The one or more non-transitory computer-readable storage media of any of examples 16 through 19, wherein the predictive machine learning model comprises a supervised machine learning model that is trained using a labeled training dataset that comprises (i) one or more ground truth labels and (ii) the one or more cross-reference embeddings or one or more structured data embeddings.

Example 21. The computer-implemented method of example 1, wherein the predictive machine learning model comprises a supervised machine learning model and the method further comprises training, using the one or more cross-reference embeddings based on the guideline-specific cross-reference data object, the predictive machine learning model to generate the one or more prediction outputs.

Example 22. The computer-implemented method of example 21, wherein the training is performed by the one or more processors.

Example 23. The computer-implemented method of example 21, wherein the one or more processors are included in a first computing entity; and the training is performed by one or more other processors included in a second computing entity.

Example 24. The computer-implemented method of example 1, wherein the one or more processors are included in a first computing entity; and the generating of the one or more modality predictions is performed by one or more other processors included in a second computing entity.

Example 25. The computing system of example 9, wherein the predictive machine learning model comprises a supervised machine learning model and the one or more processors are further configured to train, using the one or more cross-reference embeddings based on the guideline-specific cross-reference data object, the predictive machine learning model to generate the one or more prediction outputs.

Example 26. The computing system of example 25, wherein the training is performed by the one or more processors.

Example 27. The computing system of example 25, wherein the one or more processors are included in a first computing entity; and the training is performed by one or more other processors included in a second computing entity.

Example 28. The computing system of example 8, wherein the one or more processors are included in a first computing entity; and the generating of the one or more modality predictions is performed by one or more other processors included in a second computing entity.

Example 29. The one or more non-transitory computer-readable storage media of example 15, wherein the predictive machine learning model comprises a supervised machine learning model and the one or more non-transitory computer-readable storage media further comprises instructions that, when executed by the one or more processors, cause the one or more processors to train, using the one or more cross-reference embeddings based on the guideline-specific cross-reference data object, the predictive machine learning model to generate the one or more prediction outputs.

Example 30. The one or more non-transitory computer-readable storage media of example 29, wherein the training is performed by the one or more processors.

Example 31. The one or more non-transitory computer-readable storage media of example 29, wherein the one or more processors are included in a first computing entity; and the training is performed by one or more other processors included in a second computing entity.

Example 32. The one or more non-transitory computer-readable storage media of example 15, wherein the one or more processors are included in a first computing entity; and the generating of the one or more modality predictions is performed by one or more other processors included in a second computing entity.

The invention claimed is:

1. A computer-implemented method comprising:

receiving, by one or more processors, a constrained query that comprises (A) an input unstructured data object that is associated with an entity and (B) a reference to a guideline data object, wherein the reference specifies a decision tree that corresponds to the guideline data object;

generating, by the one or more processors, one or more prediction outputs for the constrained query using a predictive machine learning model that comprises one or more learned parameters previously trained by:

(i) generating a guideline-specific cross-reference data object for the guideline data object by:

(a) extracting one or more questions from the guideline data object, (b) assigning a plurality of scores to a plurality of passages from a set of one or more training unstructured data objects that correspond to the one or more questions, wherein the plurality of scores corresponds to relevancy of the plurality of passages to the one or more questions, (c) identifying, for a question of the one or more questions, one or more top ranking passages from the plurality of passages based on the plurality of scores, and (d) generating the guideline-specific cross-reference data object based on the one or more top ranking passages, wherein the guideline-specific cross-reference data object corresponds to a document comprising the one or more top ranking passages, (ii) generating one or more cross-reference embeddings based on the guideline-specific cross-reference data object, and (iii) training the one or more learned parameters using the one or more cross-reference embeddings; and initiating, by the one or more processors, performance of one or more prediction-based actions based on the one or more prediction outputs.

2. The computer-implemented method of claim 1, wherein the set of one or more training unstructured data objects are associated with one or more training entities and the guideline data object.

3. The computer-implemented method of claim 2, wherein generating the guideline-specific cross-reference data object further comprises:

generating, using a retrieval machine learning model, one or more answers to the question based on the one or more top ranking passages; and combining the one or more answers to the question with a plurality of answers to other questions of the one or more questions from the guideline data object.

4. The computer-implemented method of claim 3, further comprising:

generating a model prompt comprising the question and the one or more top ranking passages; and providing the model prompt to the retrieval machine learning model to generate the one or more answers to the question based on the one or more top ranking passages.

5. The computer-implemented method of claim 1, further comprising:

generating one or more structured data embeddings based on one or more training structured data objects corresponding to the set of one or more training unstructured data objects; and mapping the one or more cross-reference embeddings and the one or more structured data embeddings to a common feature vector space that is used to train the one or more learned parameters.

6. The computer-implemented method of claim 5, wherein the predictive machine learning model comprises a supervised machine learning model that is trained using a labeled training dataset that comprises (1) one or more ground truth labels and (2) the one or more cross-reference embeddings or the one or more structured data embeddings.

7. The computer-implemented method of claim 1, further comprising generating the one or more cross-reference embeddings based on term frequency-inverse document frequency, one-hot encoding, or character embeddings.

8. The computer-implemented method of claim 1, wherein the decision tree is associated with one or more series of questions.

9. A system comprising:

one or more processors and one or more memories storing processor-executable instructions that, when executed by the one or more processors, cause the one or more processors to perform operations comprising:

receiving a constrained query that comprises (A) an input unstructured data object that is associated with an entity and (B) a reference to a guideline data object, wherein the reference specifies a decision tree that corresponds to the guideline data object;

generating one or more prediction outputs for the constrained query using a predictive machine learning model that comprises one or more learned parameters previously trained by:

(i) generating a guideline-specific cross-reference data object for the guideline data object by:

(a) extracting one or more questions from the guideline data object, (b) assigning a plurality of scores to a plurality of passages from a set of one or more training unstructured data objects that correspond to the one or more questions, wherein the plurality of scores corresponds to relevancy of the plurality of passages to the one or more questions, (c) identifying, for a question of the one or more questions, one or more top ranking passages from the plurality of passages based on the plurality of scores, and (d) generating the guideline-specific cross-reference data object based on the one or more top ranking passages, wherein the guideline-specific cross-reference data object corresponds to a document comprising the one or more top ranking passages, (ii) generating one or more cross-reference embeddings based on the guideline-specific cross-reference data object, and (iii) training the one or more learned parameters using the one or more cross-reference embeddings; and initiating performance of one or more prediction-based actions based on the one or more prediction outputs.

10. The system of claim 9, wherein the set of one or more training unstructured data objects are associated with one or more training entities and the guideline data object.

11. The ystem of claim 10, wherein the operations further comprise:

generating, using a retrieval machine learning model, one or more answers to the question based on the one or more top ranking passages; and combining the one or more answers to the question with a plurality of answers to other questions of the one or more questions from the guideline data object.

12. The system of claim 11, wherein the operations further comprise:

generating a model prompt comprising the question and the one or more top ranking passages; and providing the model prompt to the retrieval machine learning model to generate the one or more answers to the question based on the one or more top ranking passages.

13. The system of claim 9, wherein:

(i) the predictive machine learning model comprises a supervised machine learning model that is trained using a labeled training dataset that comprises (1) one or more ground truth labels and (2) the one or more cross-reference embeddings or one or more structured data embeddings, and ii) the one or more structured data embeddings are generated based on one or more training structured data objects corresponding to the set of one or more training unstructured data objects.

14. The system of claim 9, wherein the operations further comprise generating the one or more cross-reference embeddings based on term frequency-inverse document frequency, one-hot encoding, or character embeddings.

15. The system of claim 9, wherein the decision tree is associated with one or more series of questions.

16. One or more non-transitory computer-readable media storing process-executable instructions that, when executed by one or more processors, cause the one or more processors to perform operations comprising:

receiving a constrained query that comprises (A) an input unstructured data object that is associated with an entity and (B) a reference to a guideline data object, wherein the reference specifies a decision tree that corresponds to the guideline data object;

generating one or more prediction outputs for the constrained query using a predictive machine learning model that comprises one or more learned parameters previously trained by:

(i) generating a guideline-specific cross-reference data object for the guideline data object by:

(a) extracting one or more questions from the guideline data object, (b) assigning a plurality of scores to a plurality of passages from a set of one or more training unstructured data objects that correspond to the one or more questions, wherein the plurality of scores corresponds to relevancy of the plurality of passages to the one or more questions, (c) identifying, for a question of the one or more questions, one or more top ranking passages from the plurality of passages based on the plurality of scores, and (d) generating the guideline-specific cross-reference data object based on the one or more top ranking passages, wherein the guideline-specific cross-reference data object corresponds to a document comprising the one or more top ranking passages, (ii) generating one or more cross-reference embeddings based on the guideline-specific cross-reference data object, and (iii) training the one or more learned parameters using the one or more cross-reference embeddings; and initiating performance of one or more prediction-based actions based on the one or more prediction outputs.

17. The one or more non-transitory computer-readable media of claim 16, wherein the set of one or more training unstructured data objects are associated with one or more training entities and the guideline data object.

18. The one or more non-transitory computer-readable media of claim 17, wherein the operations further comprise:

generating, using a retrieval machine learning model, one or more answers to the question based on the one or more top ranking passages; and combining the one or more answers to the question with a plurality of answers to other questions of the one or more questions from the guideline data object.

19. The one or more non-transitory computer-readable media of claim 18, wherein the operations further comprise:

generating a model prompt comprising the question and the one or more top ranking passages; and providing the model prompt to the retrieval machine learning model to generate the one or more answers to the question based on the one or more top ranking passages.

20. The one or more non-transitory computer-readable media of claim 16, wherein:

(1) the predictive machine learning model comprises a supervised machine learning model that is trained using a labeled training dataset that comprises (1) one or more ground truth labels and (2) the one or more cross-reference embeddings or one or more structured data embeddings, and (ii) the one or more structured data embeddings are generated based on one or more training structured data objects corresponding to the set of one or more training unstructured data objects.

* * * * *